United States Patent
Thomas et al.

(10) Patent No.: US 10,268,493 B2
(45) Date of Patent: Apr. 23, 2019

(54) CONNECTION-BASED RESOURCE MANAGEMENT FOR VIRTUAL DESKTOP INSTANCES

(71) Applicant: Amazon Technologies, Inc., Seattle, WA (US)

(72) Inventors: Nathan Bartholomew Thomas, Seattle, WA (US); Varun Verma, Newcastle, WA (US); Deepak Suryanarayanan, Bellevue, WA (US); Ajit Nagendra Padukone, Bellevue, WA (US); Nakul Namdeo Dhande, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/862,008

(22) Filed: Sep. 22, 2015

(65) Prior Publication Data
US 2017/0083354 A1   Mar. 23, 2017

(51) Int. Cl.
*G06F 9/455*     (2018.01)
*G06F 9/46*      (2006.01)
*G06F 15/173*    (2006.01)
*H04L 29/08*     (2006.01)
*G06F 9/451*     (2018.01)
(Continued)

(52) U.S. Cl.
CPC ............ *G06F 9/455* (2013.01); *G06F 9/4445* (2013.01); *G06F 9/452* (2018.02);
(Continued)

(58) Field of Classification Search
CPC .. G06F 9/455; G06F 9/45533; G06F 9/45558; G06F 2009/45562;
(Continued)

(56) References Cited

U.S. PATENT DOCUMENTS

2003/0061263 A1\* 3/2003 Riddle .................... H04L 29/06
                                                    718/104
2005/0198545 A1\* 9/2005 Wieck ..................... H04L 51/04
                                                    713/323
(Continued)

FOREIGN PATENT DOCUMENTS

WO        2014210172          9/2014

OTHER PUBLICATIONS

International Search Report and Written Opinion from PCT/US2016/053063, dated Dec. 2, 2016, Amazon Technologies, Inc., pp. 1-11.

*Primary Examiner* — Charles M Swift
(74) *Attorney, Agent, or Firm* — Robert C. Kowert; Meyertons, Hood, Kivlin, Kowert & Goetzel, P.C.

(57) ABSTRACT

A computing system that provides virtual computing services may generate and manage remote computing sessions between client computing devices and virtual desktop instances hosted on the service provider's network. A computing resource instance manager may monitor connections to and disconnections from a virtual desktop instance during particular time periods, and may apply a resource management policy to determine whether and when to shut down an underlying virtualized computing resource instance following a disconnection (e.g., immediately, after some period of time, or only between certain hours). A storage volume for the virtual desktop instance may be detached during a shutdown. In response to a reconnection request, the virtualized computing resource instance (or another such instance) may be restarted and the storage volume may be reattached. The computing resource instance manager may develop a model for predicting when to shut down or restart an instance based on historical data or machine learning.

18 Claims, 11 Drawing Sheets

(51) Int. Cl.
*G06F 9/48* (2006.01)
*G06F 9/50* (2006.01)
*G06F 9/44* (2018.01)

(52) U.S. Cl.
CPC ...... *G06F 9/45533* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4868* (2013.01); *G06F 9/4881* (2013.01); *G06F 9/50* (2013.01); *G06F 9/5005* (2013.01); *G06F 9/505* (2013.01); *G06F 9/5011* (2013.01); *G06F 9/5016* (2013.01); *G06F 9/5022* (2013.01); *G06F 9/5027* (2013.01); *G06F 9/5038* (2013.01); *G06F 9/5044* (2013.01); *G06F 9/5055* (2013.01); *G06F 9/5061* (2013.01); *G06F 9/5077* (2013.01); *H04L 67/24* (2013.01); *G06F 2009/4557* (2013.01); *G06F 2009/45562* (2013.01); *G06F 2009/45579* (2013.01); *G06F 2009/45583* (2013.01); *G06F 2009/45587* (2013.01); *G06F 2009/45591* (2013.01); *G06F 2009/45595* (2013.01)

(58) Field of Classification Search
CPC ... G06F 2009/4557; G06F 2009/45575; G06F 2009/45579; G06F 2009/45583; G06F 2009/45587; G06F 2009/45591; G06F 2009/45595; G06F 9/48; G06F 9/4806; G06F 9/4843; G06F 9/485; G06F 9/4868; G06F 9/4881; G06F 9/50; G06F 9/5005; G06F 9/5011; G06F 9/5016; G06F 9/5022; G06F 9/5027; G06F 9/5038; G06F 9/5044; G06F 9/505; G06F 9/5055; G06F 9/5061; G06F 9/5077
See application file for complete search history.

(56) References Cited

U.S. PATENT DOCUMENTS

| | | | |
|---|---|---|---|
| 2007/0143837 A1 | 6/2007 | Azeez et al. | |
| 2008/0034057 A1* | 2/2008 | Kumar | H04L 12/4641 709/217 |
| 2008/0235361 A1* | 9/2008 | Crosbie | G06F 9/5027 709/223 |
| 2009/0248869 A1* | 10/2009 | Ghostine | H04W 8/30 709/225 |
| 2011/0004680 A1* | 1/2011 | Ryman | G06F 9/4445 709/224 |
| 2011/0055372 A1 | 3/2011 | Elyashev et al. | |
| 2011/0055912 A1* | 3/2011 | Fusari | G06F 17/30893 726/8 |
| 2011/0184993 A1* | 7/2011 | Chawla | G06F 9/45533 707/802 |
| 2011/0276661 A1 | 11/2011 | Gujarathi et al. | |
| 2012/0096271 A1* | 4/2012 | Ramarathinam | H04L 63/0807 713/172 |
| 2012/0239729 A1 | 9/2012 | Hefter | |
| 2013/0018939 A1 | 1/2013 | Chawla et al. | |
| 2013/0061249 A1* | 3/2013 | Schwartz, Jr. | G06F 9/44521 719/318 |
| 2013/0073703 A1* | 3/2013 | Das | H04L 67/10 709/223 |
| 2013/0160011 A1* | 6/2013 | Corrie | G06F 9/455 718/1 |
| 2013/0311990 A1 | 11/2013 | Tang et al. | |
| 2014/0032761 A1 | 1/2014 | Beveridge | |
| 2014/0137112 A1* | 5/2014 | Rigolet | G06F 9/45558 718/1 |
| 2014/0165060 A1* | 6/2014 | Muller | G06F 9/5022 718/1 |
| 2014/0280898 A1 | 9/2014 | Voit et al. | |
| 2014/0366093 A1* | 12/2014 | Oh | G06F 9/45533 726/3 |
| 2015/0019728 A1 | 1/2015 | Suryanarayanan et al. | |
| 2015/0160980 A1* | 6/2015 | Swaminathan | G06F 9/505 718/1 |
| 2015/0201004 A1* | 7/2015 | Moon | H04L 67/10 709/203 |
| 2015/0281124 A1* | 10/2015 | Zhao | H04L 41/5051 709/226 |
| 2015/0331703 A1* | 11/2015 | Kelly | G06F 9/45558 718/1 |
| 2015/0347194 A1* | 12/2015 | Che | G06F 9/5077 718/1 |

* cited by examiner

CONNECTION-BASED RESOURCE MANAGEMENT FOR VIRTUAL DESKTOP INSTANCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis. Some of these virtualized resources can be used to implement virtual desktop instances on which remote computing sessions may be hosted.

Service providers that implement virtual desktop instances for the benefit of customers often shut down the underlying service provider resources each time the customer disconnects from their virtual desktop instance (e.g., by logging out). When the customer wants to reconnect to their virtual desktop instance, it can take a long time to bring the service provider resources back up, and to restart any applications that were previously running on the service provider resources so that the customer can continue working (e.g., two orders of magnitude longer than logging into a local machine).

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of systems and methods for managing resources for virtual desktop instances in a system that provides virtualized computing resources to clients are described herein. For example, a computing resource instance manager on a service provider network may monitor connections to and disconnections from a virtual desktop instance during particular time periods, and may apply a resource management policy to determine whether and/or when to shut down an underlying virtualized computing resource instance following a disconnection by the client (e.g., immediately, after some period of time, or only between certain hours). In some embodiments, one or more storage volumes for the virtual desktop instance may be detached when the virtualized computing resource instance is shut down. In response to a request to reconnect to the virtual desktop instance, the virtualized computing resource instance (or another such instance of the same type or a different type) may be restarted and the storage volume(s) may be reattached to that computing resource instance. In some embodiments, the computing resource instance manager may develop a model for predicting when to shut down or restart an instance based on historical data, such as observed patterns of disconnections and reconnections.

Figure 11:
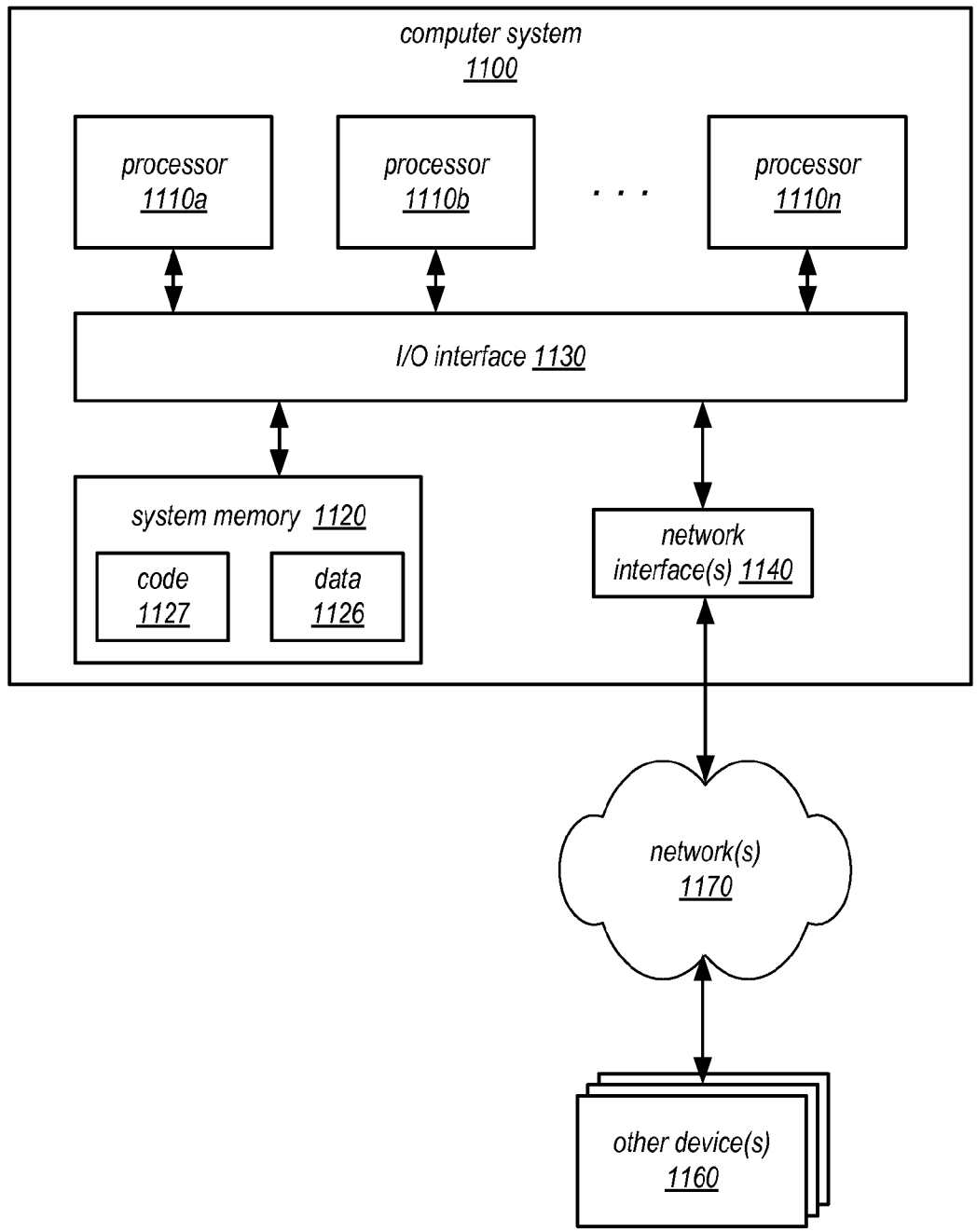
FIG. 11 is a block diagram illustrating an example computer system that implements some or all of the techniques described herein, according to different embodiments.

The systems and methods described herein may be implemented on or by one or more computing systems within a network environment, in different embodiments. An example computer system on which embodiments of the techniques for managing resources for virtual desktop instances described herein may be implemented is illustrated in FIG. 11. Embodiments of various systems and methods for implementing these techniques are generally described herein in the context of a service provider that provides to clients, via an intermediate network such as the Internet, virtualized resources (e.g., virtualized computing and storage resources) implemented on a provider network of the service provider. FIGS. 1-4 and 11 (and the corresponding descriptions thereof) illustrate and describe example environments in which embodiments of the systems and methods described herein may be implemented, and are not intended to be limiting. In at least some embodiments, at least some of the resources provided to clients of the service provider via the provider network may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider may access one or more services of the provider network via APIs to the services to obtain and configure resource instances and to establish and manage virtual network configurations that include the resource instances, for example virtualized private networks.

Figure 4:
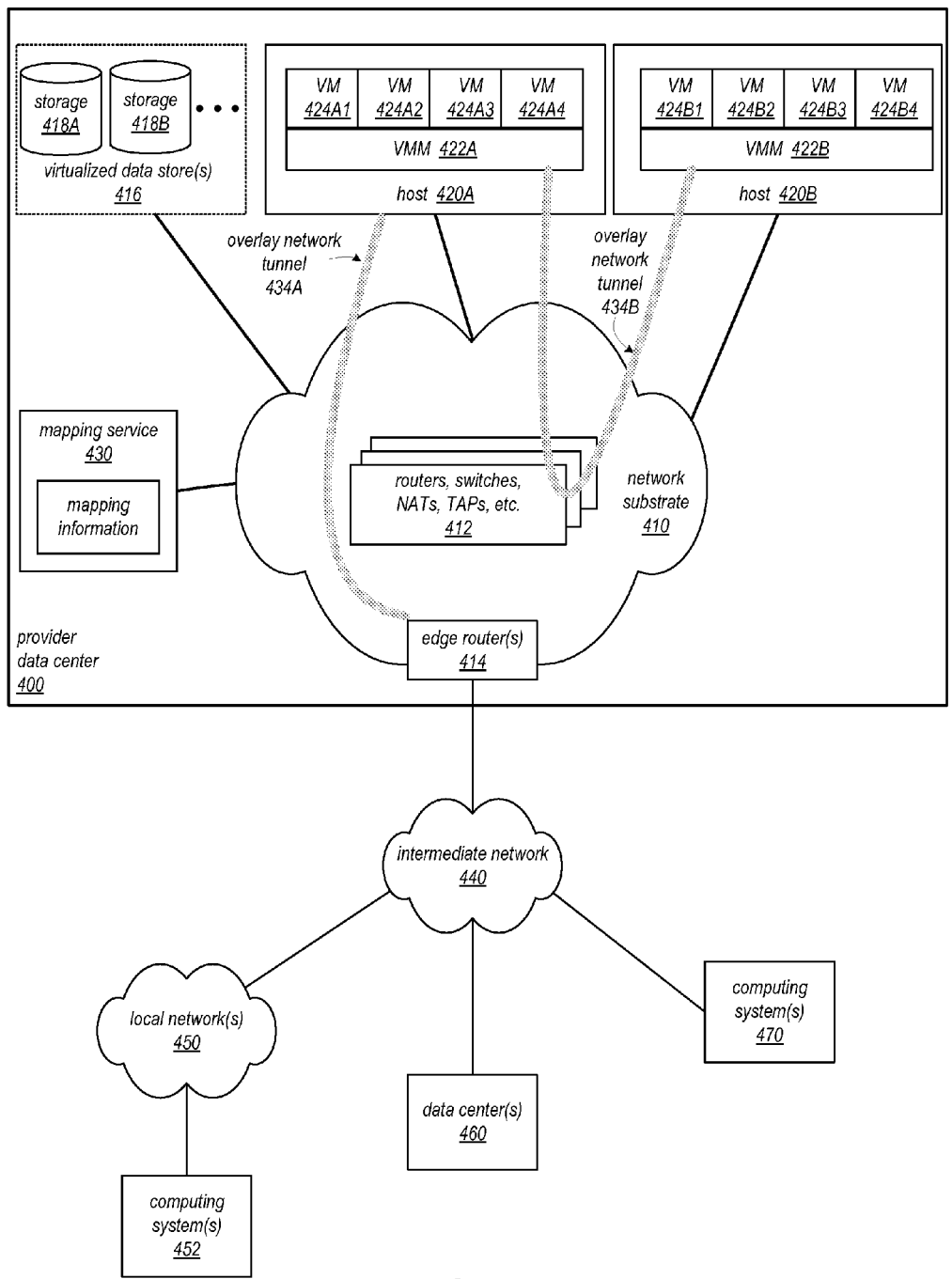
FIG. 4 is a block diagram illustrating an example service provider data center, according to at least some embodiments.

In some embodiments, the resource instances may, for example, be implemented according to hardware virtualization technology that enables multiple operating systems to run concurrently on a host computer, i.e. as virtual machines (VMs) on the hosts. A hypervisor, or virtual machine monitor (VMM), on a host may present the VMs on the host with a virtual platform and monitors the execution of the VMs. Each VM may be provided with one or more private IP addresses; the VMM on a host may be aware of the private IP addresses of the VMs on the host. An example of a system that employs such a hardware virtualization technology is illustrated in FIG. 4 and described in detail below.

Example Provider Network Environments

This section describes example provider network environments in which embodiments of the methods described herein may be implemented. However, these example provider network environments are not intended to be limiting. In various embodiments, in these provider network environments, a service provider may host virtualized resource instances on behalf of a customer that can be access by end users. For example, end users who are associated with the customer on whose behalf the virtualized resources instances are hosted (e.g., members of the same organization or enterprise) may be able to access the virtualized resources instances using client applications on client devices. In some embodiments, the virtualized resources instances may be configured to implement virtual desktop instances.

Figure 1:
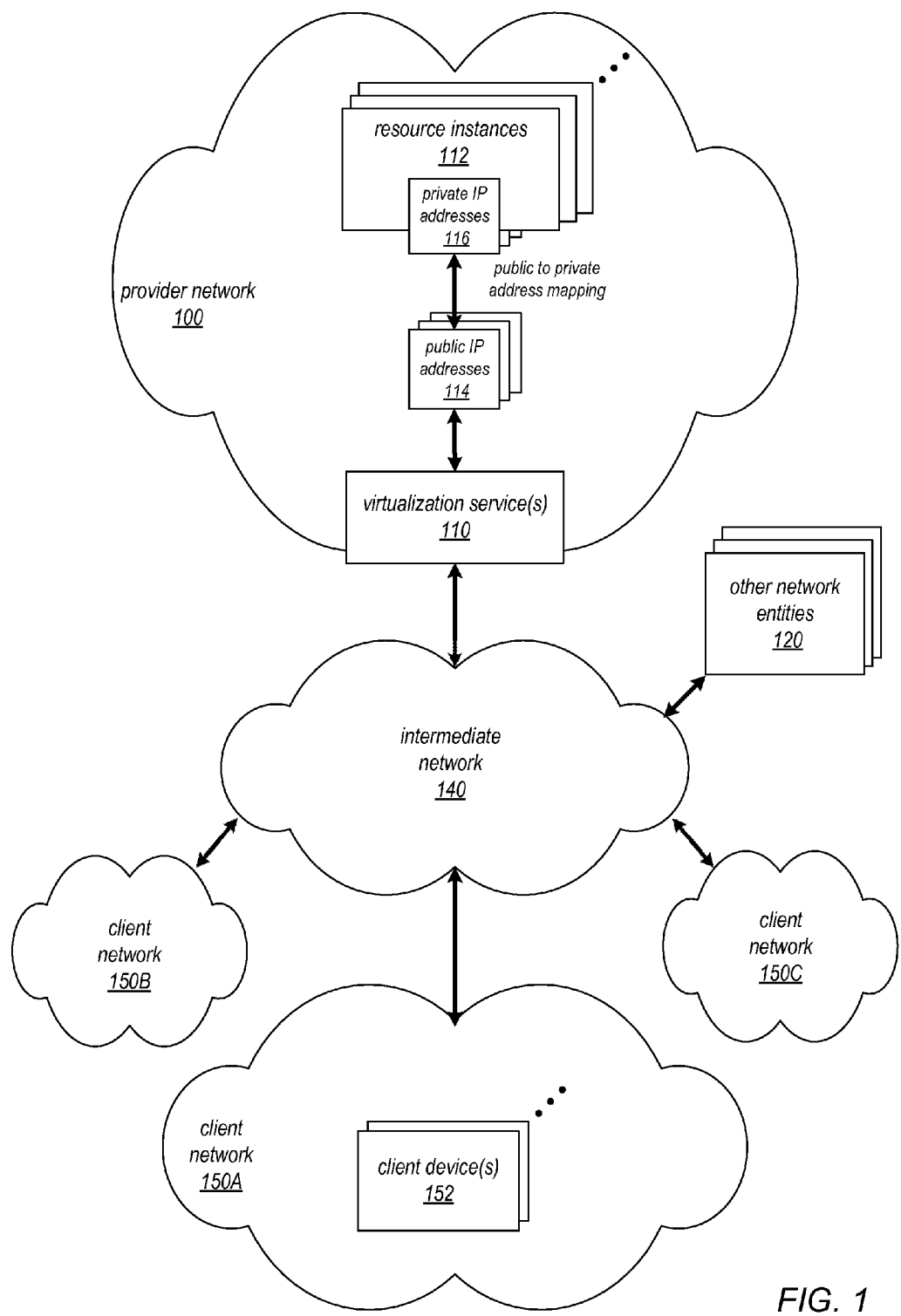
FIG. 1 is a block diagram illustrating an example provider network environment, according to at least some embodiments.

FIG. 1 illustrates an example provider network environment, according to at least some embodiments. A provider network 100 may provide resource virtualization to clients via one or more virtualization services 110 that allow clients to purchase, rent, or otherwise obtain instances 112 of virtualized resources, including but not limited to computation and storage resources, implemented on devices within the provider network or networks in one or more data centers. Private IP addresses 116 may be associated with the resource instances 112; the private IP addresses are the internal network addresses of the resource instances 112 on the provider network 100. In some embodiments, the provider network 100 may also provide public IP addresses 114 and/or public IP address ranges (e.g., Internet Protocol version 4 (IPv4) or Internet Protocol version 6 (IPv6) addresses) that clients may obtain from the provider 100.

Conventionally, the provider network 100, via the virtualization services 110, may allow a client of the service provider (e.g., a client that operates client network 150A, 150B, or 150C, each of which may include one or more client devices 152) to dynamically associate at least some public IP addresses 114 assigned or allocated to the client with particular resource instances 112 assigned to the client. The provider network 100 may also allow the client to remap a public IP address 114, previously mapped to one virtualized computing resource instance 112 allocated to the client, to another virtualized computing resource instance 112 that is also allocated to the client. For example, using the virtualized computing resource instances 112 and public IP addresses 114 provided by the service provider, a client of the service provider such as the operator of client network 150A may implement client-specific applications and present the client's applications on an intermediate network 140, such as the Internet. Other network entities 120 on the intermediate network 140 may then generate traffic to a destination public IP address 114 published by the client network 150A; the traffic is routed to the service provider data center, and at the data center is routed, via a network substrate, to the private IP address 116 of the virtualized computing resource instance 112 currently mapped to the destination public IP address 114. Similarly, response traffic from the virtualized computing resource instance 112 may be routed via the network substrate back onto the intermediate network 140 to the source entity 120.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 100; a client may then assign their allocated public IP addresses to particular resource instances allocated to the client. These public IP addresses may be referred to as client public IP addresses, or simply client IP addresses. Instead of being assigned by the provider network 100 to resource instances as in the case of standard IP addresses, client IP addresses may be assigned to resource instances by the clients, for example via an API provided by the service provider. Unlike standard IP addresses, client IP addresses may be allocated to client accounts and remapped to other resource instances by the respective clients as necessary or desired. In some embodiments, a client IP address is associated with a client's account, not a particular resource instance, and the client controls that IP address until the client chooses to release it. Unlike conventional static IP addresses, client IP addresses may allow the client to mask resource instance or availability zone failures by remapping the client's public IP addresses to any resource instance associated with the client's account. The client IP addresses, for example, may enable a client to engineer around problems with the client's resource instances or software by remapping client IP addresses to replacement resource instances.

Note also that in some embodiments, the resource instances 112 that are made available to clients (e.g., client devices 152) via virtualization service(s) 110 may include multiple network interfaces. For example, at least some of them may include one network interface for communicating with various components of a client network 150 and another network interface for communicating with resources or other network entities on another network that is external to provider network 100 (not shown).

Figure 2:
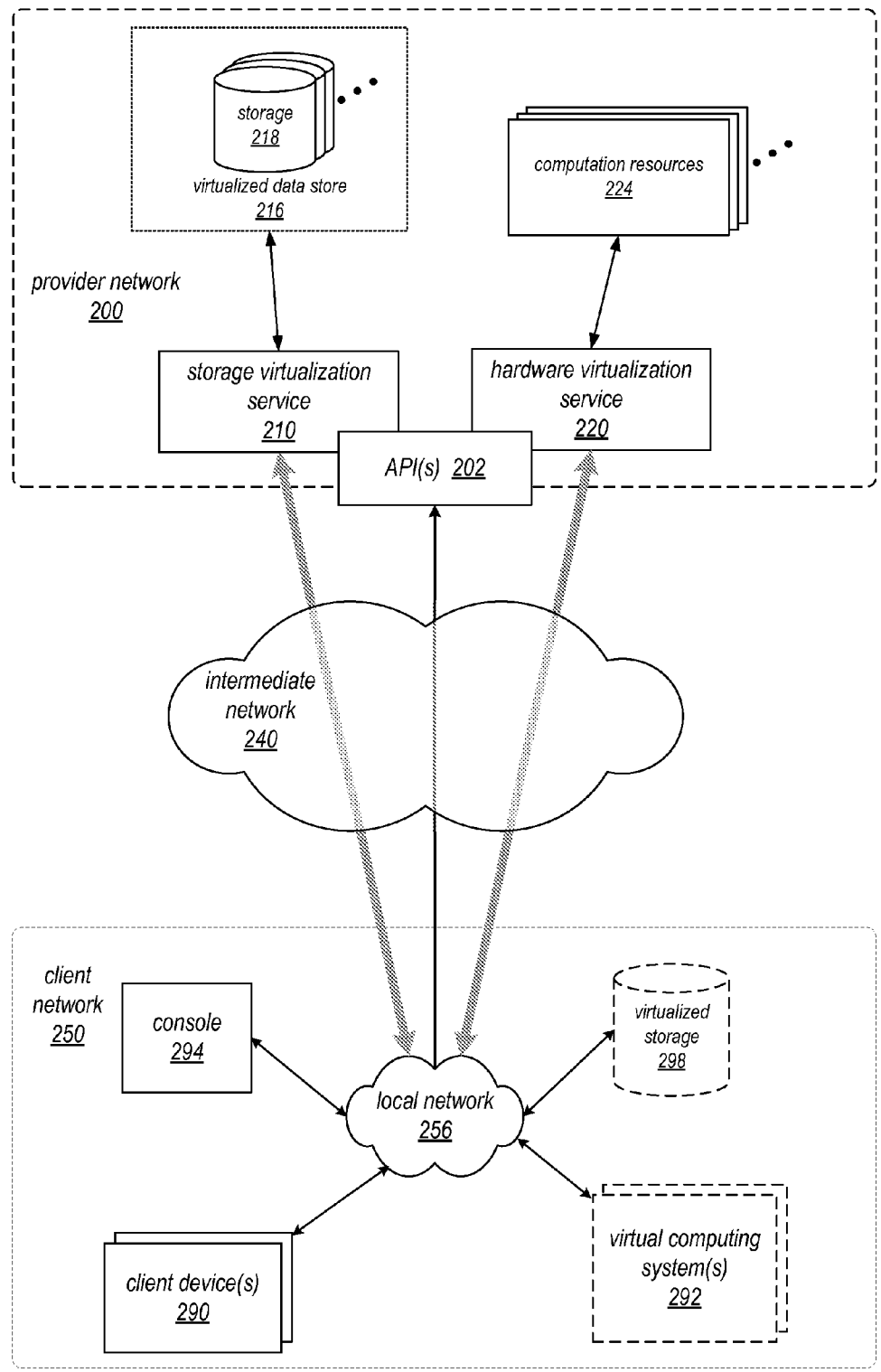
FIG. 2 is a block diagram illustrating an example provider network that provides a storage virtualization service and a hardware virtualization service to clients, according to at least some embodiments.

FIG. 2 is a block diagram of another example provider network environment, one that provides a storage virtualization service and a hardware virtualization service to clients, according to at least some embodiments. In this example, hardware virtualization service 220 provides multiple computation resources 224 (e.g., VMs) to clients. The computation resources 224 may, for example, be rented or leased to clients of the provider network 200 (e.g., to a client that implements client network 250). Each computation resource 224 may be provided with one or more private IP addresses. Provider network 200 may be configured to route packets from the private IP addresses of the computation resources 224 to public Internet destinations, and from public Internet sources to the computation resources 224.

Provider network 200 may provide a client network 250, for example coupled to intermediate network 240 via local network 256, the ability to implement virtual computing systems 292 via hardware virtualization service 220 coupled to intermediate network 240 and to provider network 200. In some embodiments, hardware virtualization service 220 may provide one or more APIs 202, for example a web services interface, via which a client network 250 may access functionality provided by the hardware virtualization service 220, for example via a console 294. In at least some embodiments, at the provider network 200, each virtual computing system 292 at client network 250 may correspond to a computation resource 224 that is leased, rented, or otherwise provided to client network 250.

From an instance of a virtual computing system 292 and/or another client device 290 or console 294, the client may access the functionality of storage virtualization service 210, for example via one or more APIs 202, to access data from and store data to a virtual data store 216 provided by the provider network 200. In some embodiments, a virtualized data store gateway (not shown) may be provided at the client network 250 that may locally cache at least some data, for example frequently accessed or critical data, and that may communicate with virtualized data store service 210 via one or more communications channels to upload new or modified data from a local cache so that the primary store of data (virtualized data store 216) is maintained. In at least some embodiments, a user, via a virtual computing system 292 and/or on another client device 290, may mount and access one or more storage volumes 218 of virtual data store 216, each of which appears to the user as local virtualized storage 298.

While not shown in FIG. 2, the virtualization service(s) may also be accessed from resource instances within the provider network 200 via API(s) 202. For example, a client, appliance service provider, or other entity may access a virtualization service from within a respective private network on the provider network 200 via an API 202 to request allocation of one or more resource instances within the private network or within another private network. Note that in some embodiments, the hardware virtualization service 220 may be configured to provide computation resources 224 that have been configured to implement a virtual desktop instance, which may appear to the user as a local desktop (implemented by a virtual computing system 292). Note also that in some embodiments, the computation resources 224 that are made available to the client via hardware virtualization service 220 may include multiple network interfaces. For example, at least some of them may include one network interface for communicating with various components of client network 250 and another network interface for communicating with computation resources or other network entities on another network that is external to provider network 200 (not shown).

In some embodiments, various components of a service provider network may be configured for the generation and management of remote computing sessions between client computing devices and virtual desktop instances hosted by one or more remote data center computers of a Program Execution Service (PES) platform. A number of data centers may be organized as part of a single PES platform that can facilitate the utilization of resources of the data centers by customers of the PES. In some embodiments, the PES may include several hundreds or thousands of data center computers. For example, in some embodiments, client computing devices may access the virtual desktop instances during one or more remote computing sessions, and a virtual desktop instance may provide a user with all of the capabilities of a client desktop environment but with centralized provisioning of the services accessed by the client.

In some embodiments, a user, via a client computing device, may transmit a request to load an application such as a remote computing application. Subsequent to the receipt of the request, the client computing device may communicate with a PES platform to start a remote computing session. In one embodiment, the communication between the client computing device and the PES platform may include login information. In other embodiments, the communication may also include information identifying resource usage information, processing requirements, or rules regarding the duration or conditions of the remote computing session for the user of the client computing device. The client computing device may further communicate various information relating to the device state, including, but not limited to, a current or future availability of device resources (e.g., processing power, memory, storage, network usage, etc.). Using the information received, the PES platform may identify one or more virtual desktop instances for execution in one or more remote computing sessions. In one example, the PES platform may instantiate, or cause to have instantiated, a virtual machine instance on a data center computer, and the virtual machine instance may include an operating system. The client computing device may then establish a remote computing session with the virtual machine, and the user interface of the operating system (e.g., the output of the operating system, such as a graphical user interface, sound, etc.) may be sent to the client computing device via a particular network interface of the virtual machine instance or virtual desktop instance and presented to the user (e.g., the graphical user interface may be rendered on a display of the client computing device). The operating system may use a desktop profile associated with the user and stored on a desktop store accessible by the PES to configure the virtual desktop instance for the user by setting the desktop background, screen saver, desktop layout, pointer preferences, sound settings, and the like. User input such as mouse and keyboard activity may then be sent to the virtual machine (via a particular network interface of the virtual machine instance or virtual desktop instance) and injected into the operating system as if the activity was performed by a user directly at the virtual machine.

In some embodiments, the PES platform may receive or generate data associated with the interaction of the client computing device with the virtual desktop instance on the client computing device during the remote computing session. The data may include user data and preferences, files, and the like. Upon receiving the data, the PES platform may save the data to the desktop store associated with the virtual desktop instance. In some embodiments, the desktop store may be implemented on a volume, or on another logical block storage device. In some embodiments, the PES may create a backup copy of the data or also store the data to a central repository. The saved data may then be used to restore remote computing sessions that have been interrupted due to a failure, such as a failure of the virtual desktop instance, the server hosting the virtual desktop instance, the network, etc. By saving the user data, the PES platform may ensure that the re-establishment of a remote computing session occurs with minimal delay and disruption to a user of a client computing device.

In some embodiments, the virtual desktop instance provided may be configured according to a user profile stored at a user profile store of the PES. The configuration of the virtual desktop instance may also be adjusted according to monitored usage of the instance. In some embodiments, the user profile may be set by an administrator associated with an entity governing the user's use. The user profile may indicate various memory and processing requirements associated with the PES computers executing the one or more virtual desktop instances as well as requirements for the virtual desktop instances. For example, the user profile may indicate the programs to which the user is given access while using the virtual desktop instance. The user profile may also indicate a maximum time or cost associated with the remote computing session. The PES may take a user profile for the user into consideration when placing and configuring the virtual desktop instances. In addition, placement and configuration decisions may also be adjusted based on a user's interaction with the virtual desktop over time.

Figure 3:
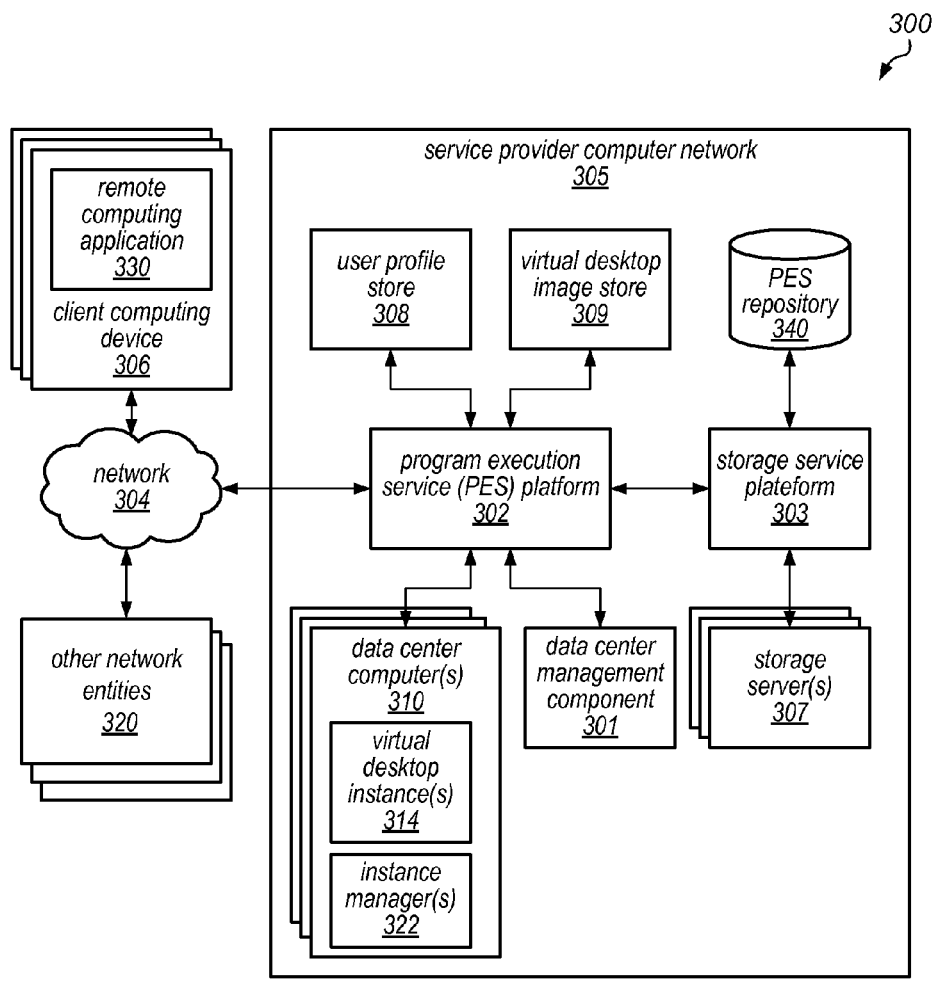
FIG. 3 is a block diagram illustrating a networked computing environment that includes a client computing device in communication with a service provider computer network, according to at least some embodiments.

FIG. 3 is a block diagram illustrating an example networked computing environment 300 that includes a client computing device 306 in communication with a service provider computer network 305 via the communication network 304. The client computing device 306 may be used for providing access to a remote operating system and applications to a user. In various embodiments, the client computing device 306 may correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In some embodiments, the client computing device 306 includes necessary hardware and software components for establishing communications over a communication network 304, such as a wide area network or local area network. For example, the client computing device 306 may be equipped with networking equipment and browser software applications that facilitate communications via the Internet or an intranet. The client computing device 306 may have varied local computing resources such as central processing units and architectures, memory, mass storage, graphics processing units, communication network availability and bandwidth, etc.

In one embodiment, the client computing device 306 may run a remote computing application 330. The remote computing application 330 may request access to a virtual desktop instance hosted by the service provider computer network 305. The remote computing application 330 may also manage the remote computing session between the client computing device 306 and the service provider computer network 305. As illustrated in FIG. 3, the service provider computer network 305 may also include a PES platform 302. The PES platform 302 illustrated in FIG. 3 corresponds to a logical association of one or more data centers associated with a service provider. The PES platform 302 may be associated with a number of data center computers, such as, for example, data center computers 310. Each data center computer 310 may host one or more virtual desktop instances 314. For example, the data center computer 310 may host a virtual desktop instance by executing a virtual machine on a physical device. The virtual machine may execute an instance of an operating system and application software to create a virtual desktop instance. Each virtual desktop instance executed by the PES 302 may be accessed by one or more client computing devices, such as client computing device 306.

In some embodiments, data center computers 310 may be associated with private network addresses, such as IP addresses, within the service provider computer network 305 such that they may not be directly accessible by the client computing devices 306. The virtual desktop instances 314 may be associated with public network addresses that may be made available by a gateway at the edge of the service provider computer network 305. Accordingly, the virtual desktop instances 314 may be directly addressable by client computing devices 306 via the public network addresses. One skilled in the relevant art will appreciate that each data center computer 310 would include physical computing device resources and software to execute the multiple virtual desktop instances 314 or to dynamically instantiate virtual desktop instances 314. Such instantiations can be based on a specific request, such as from the client computing device 306.

As illustrated in FIG. 3, the data center computers 310 may include one or more instance managers 322. The instance managers 322 may be on the same computer as the respective instances 314, or on a separate computer. The instance managers 322 may track progress of the instances executed on the data center computers 310, monitor and coordinate the storage of data created by the user while interacting with the instances 314 via the client computing devices, and monitor the overall health and state of the data center computers 310 and of the remote computing applications running on the client computing devices 306. The instance managers 322 may communicate information collected through tracking and monitoring with the data center management component 301 of the PES platform 302 in order to efficiently manage the various remote computing sessions between the data center computers 310 and the client computing devices 306. In some embodiments, the techniques described herein for detecting activity or inactivity on a virtual desktop instance, monitoring and tracking connections to, disconnections from, and reconnections to various virtual desktop instances, and determining whether and/or when to shut down the underlying virtualized computing resources may be performed by the instance managers 322.

As illustrated in FIG. 3, the service provider network 305 may also include a storage service platform 303. The storage service platform 303 may include, or be connected to, one or more storage servers 307. The storage servers 307 may be used for storing data generated or utilized by the virtual desktop instances 314. The data generated or utilized by the virtual desktop instances 314 may be based on the interaction between the client computing devices 306 and the PES 302 via one or more remote computing sessions.

In some embodiments, the storage service platform 303 may logically organize and maintain information associated with a hosted virtual desktop instance 314 in a desktop store. The information associated with a virtual desktop instance 314 maintained in the desktop store may include, but is not limited to, user preferences, user or customer-specific policies, information associated with the execution of program data, user content, references to user content, and the like. For example, folders used by the user to store music, files, and the like on other storage devices, including through storage service providers, may also be mapped to the desktop store via references to those storage locations. That is to say, input/output operations, such as requests to open files in these folders, can be redirected to the desktop store. Thus, when a user attempts to open a file stored in his or her document folder, the request can be redirected by the operating system running in the virtual desktop instance to the desktop store. In addition to the data created by the user, the user's desktop profile, which may include, for example, configuration information for the desktop such as the background picture, fonts, arrangement of icons, and the like, may also be stored on the desktop store associated with the user's virtual desktop instance. In some embodiments, the service provider computer network 305 may be able to mitigate the effect of failures of the data center computer(s) 310 running the virtual desktop instances 314 or errors associated with the execution of virtual desktop instances 314 on the data center computer(s) 310 by storing data on storage servers independent from the data center computers 310. Additionally, the service provider network 305 may also facilitate client interaction with multiple virtual desktop instances 314 by maintaining the information in the desktop stores. In some embodiments, if one virtual desktop instance 314 fails, a new instance may be launched and attached to the same desktop store that was previously attached to the virtual desktop instance 314 that failed.

In various embodiments, the desktop stores may be distributed across multiple servers, they may be replicated for performance purposes on servers in different network areas, or they may be replicated across multiple servers with independent failure profiles for backup or fault performance purposes. For example, the servers may be attached to different power sources or cooling systems, the servers may be located in different rooms of a data center or in different data centers, and/or the servers may be attached to different routers or network switches. In some embodiments, a desktop store may be located on one storage server, and changes made to the desktop store may be replicated to another desktop store on a different storage server. Such replication may create a backup copy of the user's data. If the desktop store fails or the virtual desktop instance 314 loses its connection to the desktop store, the PES 302 may switch the connection of the virtual desktop instance 314 from the desktop store to the back-up desktop store.

As illustrated in FIG. 3, the PES platform 302 may also include a central storage device such as a PES repository 340 for storing data stored by the various desktop stores and backup stores on storage servers 307. The data center computers 310 and the storage servers 307 may further include additional software or hardware components that facilitate communications including, but not limited to, load balancing or load sharing software/hardware components for selecting instances of a virtual machine supporting a requested application and/or providing information to a DNS name server to facilitate request routing.

As illustrated in this example, the service provider computer network 305 may include a user profile store 308. The user profile store 308 may be used to store, for example, various programs a user is given access to while using a virtual desktop instance 314. The user profiles stored may also indicate a maximum time or cost associated with the remote computing sessions of different users. The PES platform 302 may take user profiles into consideration when placing, configuring, and/or managing virtual desktop instances 314. The PES platform 302 may also include, or be connected to, a virtual desktop image store 309. The virtual desktop image store 309 may include template images of operating systems without customizations applied per user profiles.

In some embodiments, data center computers 310 and storage servers 307 may be considered to be logically grouped, regardless of whether the components, or portions of the components, are physically separate. For example, a service provider computer network 305 may maintain separate locations for providing the virtual desktop instances 314 and the storage components. Additionally, although the data center computers 310 are illustrated in FIG. 3 as logically associated with a PES platform 302, the data center computers 310 may be geographically distributed in a manner to best serve various demographics of its users. Additionally, one skilled in the relevant art will appreciate that the service provider computer network 305 may be associated with various additional computing resources, such additional computing devices for administration of content and resources, and the like. For example, the service provider computer network 305 (and/or various ones of the virtual desktop instances 314 implemented thereon) may be configured to communicate with other network entities 320 over communication network 304 or over another communication network (e.g., at least some of the virtual desktop instances 314 may include a network interface usable to access one or more other network entities 320 that is separate and distinct from to a network interface that is usable to communicate with client computing device 306). These other network entities 320 may include, for example, other client networks or computing devices thereof, computing systems that provide resources for servicing requests received from client computing device 306, and/or networks or computing devices thereof that access other services, applications, or data over the Internet.

In some embodiments, the processing requirements associated with a user or a client computing device may be determined based on a variety of scenarios. In some embodiments, the determination may be based on a user request at launching of the remote computing application 330. For example, the user may be presented with a graphical user interface (GUI) displaying a variety of options for resources and applications. The user may then select the applications they wish to have access to, or, alternatively, the version of those applications. For example, one user may wish to access a basic version of an application while another user may wish to access a professional version of the same application. The determination may also be based on pre-selected options for certain users as determined by administrators of entities associated with the users. For example, the pre-selected options may be presented to the user as a list of different packages of applications to which the user may wish to have access. In some cases, the determination may be made on historical usage data of a user, which the PES platform 302 may determine once the request is received from the user. In other cases, the determination of the processing requirements may be based on ongoing monitoring of use of processes by the user once the remote computing session is initiated. In such cases, the selection of adequate resource instances may be dynamically changed after the session is established, and the dynamic change over to new instance(s) may be performed as described with respect to FIG. 3 above. In some embodiments, the remote computing application 330 may request that a virtual desktop session be opened on behalf of the client, in response to which a virtual desktop instance 314 may be instantiated, configured for the use of the client, and/or connected to the client computing device 306 over network 304 (e.g., via one of two network interfaces of the virtual desktop instance 314).

In some embodiments, a service provider network that implements VMs and VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are. An example use of overlay network technology is illustrated in FIG. 4 and described in detail below.

In various embodiments, client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

FIG. 4 illustrates an example data center (e.g., one that implements an overlay network on a network substrate using IP tunneling technology), according to at least some embodiments. As illustrated in this example, a provider data center 400 may include a network substrate that includes networking devices 412 such as routers, switches, network address translators (NATs), and so on. At least some embodiments may employ an Internet Protocol (IP) tunneling technology to provide an overlay network via which encapsulated packets may be passed through network substrate 410 using tunnels. The IP tunneling technology may provide a mapping and encapsulating system for creating an overlay network on a network (e.g., a local network in data center 400 of FIG. 4) and may provide a separate namespace for the overlay layer (the public IP addresses) and the network substrate 410 layer (the private IP addresses). Packets in the overlay layer may be checked against a mapping directory (e.g., provided by mapping service 430) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 430) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 4, an example overlay network tunnel 434A from a virtual machine (VM) 424A on host 420A to a device on the intermediate network 440 (e.g., a computing system 470, a computing system 452 on local network 450, or a data center 46), and an example overlay network tunnel 434B between a VM 424B on host 420B and a VM 424A on host 420A are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

At least some networks in which embodiments of the techniques described herein for managing resources for virtual desktop instances may be implemented may include hardware virtualization technology that enables multiple operating systems to run concurrently on a host computer (e.g., hosts 420A and 420B of FIG. 4), i.e. as virtual machines (VMs) 424 on the hosts 420. The VMs 424 (some of which may be configured to implement a virtual desktop instance for the use of a client) may, for example, be rented or leased to clients of a network provider. A hypervisor, or virtual machine monitor (VMM) 422, on a host 420 may serve as an instance manager for the VMs 424 and/or other virtualized resource instances on the hosts 420, which may include presenting the VMs 424 on the host with a virtual platform and monitoring the execution of the VMs 424. In some embodiments, the techniques described herein for detecting activity or inactivity on a virtual desktop instance, monitoring and tracking connections to, disconnections from, and reconnections to various virtual desktop instances, and determining whether and/or when to shut down the underlying virtualized computing resources may be performed by the VMM 422. Each VM 424 may be provided with one or more private IP addresses; the VMM 422 on a host 420 may be aware of the private IP addresses of the VMs 424 on the host. A mapping service 430 may be aware of all network IP prefixes and the IP addresses of routers or other devices serving IP addresses on the local network. This includes the IP addresses of the VMMs 422 serving multiple VMs 424. The mapping service 430 may be centralized, for example on a server system, or alternatively may be distributed among two or more server systems or other devices on the network. A network may, for example, use the mapping service technology and IP tunneling technology to, for example, route data packets between VMs 424 on different hosts 420 within the data center 400 network; note that an interior gateway protocol (IGP) may be used to exchange routing information within such a local network.

In addition, a network such as the provider data center 400 network (which is sometimes referred to as an autonomous system (AS)) may use the mapping service technology, IP tunneling technology, and routing service technology to route packets from the VMs 424 to Internet destinations, and from Internet sources to the VMs 424. Note that an external gateway protocol (EGP) or border gateway protocol (BGP) is typically used for Internet routing between sources and destinations on the Internet. FIG. 4 shows an example provider data center 400 implementing a network that provides resource virtualization technology and that provides full Internet access via edge router(s) 414 that connect to Internet transit providers, according to at least some embodiments. The provider data center 400 may, for example, provide clients the ability to implement virtual computing systems (VMs 424) via a hardware virtualization service (such as hardware virtualization service 220 in FIG. 2) and the ability to implement virtualized data stores 416 on storage resources 418 via a storage virtualization service (such as storage virtualization service 210 in FIG. 2).

In some embodiments, the data center 400 network may implement IP tunneling technology, mapping service technology, and a routing service technology to route traffic to and from virtualized resources, for example to route packets from the VMs 424 on hosts 420 in data center 400 to Internet destinations, and from Internet sources to the VMs 424. Internet sources and destinations may, for example, include computing systems 470 connected to the intermediate network 440 and computing systems 452 connected to local networks 450 that connect to the intermediate network 440 (e.g., via edge router(s) 414 that connect the network 450 to Internet transit providers). The provider data center 400 network may also route packets between resources in data center 400, for example from a VM 424 on a host 420 in data center 400 to other VMs 424 on the same host or on other hosts 420 in data center 400. In some embodiments, at least some of the VMs 424 may include two or more network interfaces. For example, they may include one network interface usable for communications between VMs 424 and the clients on whose behalf VMs 424 are hosted by the provider and a second (separate and distinct) network interface that is usable to access external resources, computing systems, data centers, or Internet destinations on networks other than the provider network and the client network, either or both of which may employ an IP tunneling technology, as described herein.

A service provider that provides data center 400 may also provide additional data center(s) 460 that include hardware virtualization technology similar to data center 400 and that may also be connected to intermediate network 440. Packets may be forwarded from data center 400 to other data centers 460, for example from a VM 424 on a host 420 in data center 400 to another VM on another host in another, similar data center 460, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 418, as virtualized resources to clients of a network provider in a similar manner.

Note that a public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network, or between a provider network and other network entities (e.g., external resources, computing systems, data centers, or Internet destinations on networks other than the provider network and the client network on whose behalf VMs 424 are hosted by the provider).

In some embodiments, while there are physical computers executing client applications and other processes described herein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in a control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a component on the same node) without needing to rely on these data plane network connections.

In some embodiments, a customer may have an application running on a local machine, but may provision resources instances in a cloud computing environment to be used in case of a failure on the local machine. In some embodiments, multiple resource instances may be executing in a cloud computing environment to implement a distributed application on behalf of a client. In different embodiments, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients.

In various embodiments, a provider of virtual computing services may implement private networks on the provider network for at least some clients. A client's virtualized private network on the service provider network, for example, may enable a client to connect their existing infrastructure (e.g., client devices) on the client network to a set of logically isolated resource instances (e.g., VMs and storage devices or volumes), and to extend management capabilities such as security services, firewalls, and intrusion detection systems to include their resource instances. In some embodiments, a client's virtualized private network may be connected to a client network via a private communications channel. A private communications channel may, for example, be a tunnel implemented according to a network tunneling technology or some other peering connection over an intermediate network. The intermediate network may, for example, be a shared network or a public network such as the Internet. Alternatively, a private communications channel may be implemented over a direct, dedicated connection between a virtualized private network and a client network.

To establish a virtualized private network for a client on provider network, one or more resource instances (e.g., VMs storage devices or volumes) may be allocated to the virtualized private network. Note that other resource instances may remain available on the provider network for the use of other clients. A range of public IP addresses may also be allocated to the virtualized private network. In addition, one or more networking devices (routers, switches, etc.) of the provider network may be allocated to the virtualized private network. A private communications channel may be established between a private gateway at virtualized private network and a gateway at a client network. In at least some embodiments, in addition to, or instead of, a private gateway, a virtualized private network may include a public gateway that enables resources within the virtualized private network to communicate directly with other entities (e.g., network entities) via an intermediate network, and vice versa, instead of or in addition to via a private communications channel. In some embodiments, a virtualized private network may be, but is not necessarily, subdivided into two or more subnets (not shown). In other embodiments, one or more VMs may be configured to access a client network over a private communications channel through a private gateway (e.g., via a network interface that is configured for communication between the VM and a client device) and to access other network entities over an alternate communications channel through a public gateway.

In some embodiments, the client may assign particular client public IP addresses to particular resource instances in a virtualized private network. A network entity on an intermediate network may then send traffic to a public IP address published by the client; the traffic may be routed, by the provider network, to the associated resource instance. Return traffic from the resource instance may be routed, by the provider network, back to the network entity over the intermediate network. Note that routing traffic between a resource instance and a network entity may require network address translation to translate between the public IP address and the private IP address of the resource instance. At least some embodiments may allow a client to remap public IP addresses in a client's virtualized private network to devices on the client's external network. When a packet is received (e.g., from a network entity), the network may determine that the destination IP address indicated by the packet has been remapped to an endpoint on an external network and handle routing of the packet to the respective endpoint, either via a private communications channel, an alternate communications channel, or an intermediate network. Response traffic may be routed from the endpoint to the network entity through the provider network, or alternatively may be directly routed to the network entity by the client network. From the perspective of the network entity, it may appear as if the network entity is communicating with the public IP address of the client on the provider network. However, the network entity may actually be communicating with the endpoint on the client network.

Connection-Based Resource Management for Virtual Desktop Instances

In various embodiments, a service provider may employ one of the example provider networks described above (or another suitable provider network environment) to implement a hosted desktop service in a cloud computing environment. In such embodiments, a customer may access the provider network in the cloud computing environment to request the instantiation and/or configuration of one or more virtual desktop instances in the cloud, and may then provide access to those virtual desktop instances to one or more end users (e.g., through a client application). For example, an administrator within an organization or enterprise may set up an account with a service provider, may contract with the service provider to set up some number of virtual desktop instances, and (once the virtual desktop instances are set up), may provide credentials for accessing these virtual desktop instances. In this example, once the virtual desktop instances have been set up and credentials have been provided, one or more end users may launch a client application on their a client device (e.g., a computer, tablet device, or other mobile device) and enter the credentials for the virtual desktop instance, after which they may be logged into a virtual desktop environment. Although the virtual desktop environment is implemented by virtualized resource instances in the cloud computing environment, it may appear to the end user as if it were a local desktop and it may operate as if it were an independent computer to which the user is connected. In some embodiments, the virtual desktop environment may provide access to productivity software and other software programs to which the user would typically have access if the user were logged onto a physical computer owned by the organization or enterprise.

In some embodiments, these virtual desktop instances may be intended to replace a desktop computer, e.g., they may be intended to run the same software programs that a member of the organization or enterprise on whose behalf they were instantiated and configured would access on a desktop computer in an office setting (e.g., applications that perform end-user productivity tasks). Note that these applications may or may not be stand-alone applications. For example, in some cases, each of the virtual desktop instances (and/or the applications running thereon) may be part of the active directory framework of the organization or enterprise and may be able to access shared files or other resources on the existing network of the organization or enterprise once the credential presented by the user upon logging into the virtual desktop instance have been authenticated.

In some embodiments of the systems described herein, a computing resource instance manager (or another component on the service provider network) may implement some or all of the techniques described herein for managing the resources that implement a virtual desktop instance, both when a client is connected to the virtual desktop instance and when no client is connected to the virtual desktop instance. In some embodiments, these techniques may include intelligently dropping unconnected sessions (e.g., shutting down the underlying computing resource instance for the virtual desktop instance) while maintaining data for the virtual desktop instance in a storage volume that is uncounted from the underlying computing resource instance). This may allow the service provider to more efficiently manage its resources (e.g., if capacity becomes constrained, or simply to avoid incurring costs for resources that are not being used). In some embodiments, the systems described herein may provide a high degree of availability to customers and a good customer (and/or end user) experience when connecting or reconnecting to a virtual desktop instance, while allowing the service provider to reclaim resources when they are not being used (e.g., when the customer or end user is not connected). As described in more detail herein, in some embodiments, the service provider may implement a connection-based and/or "time bucket" based approach to managing resources for virtual desktop instances, which may or may not carry over into its approach to billing customers for those virtual desktop instances.

In some embodiments, when the service provider (or a computing resource instance manager on the service provider network) detects that there is no user connected to a particular virtual desktop instance, the service provider (or computing resource instance manager) may, after a certain number of minutes of inactivity (according to a configurable and/or predefined threshold), shut down the underlying computing resource instance. As previously noted, when the computing resource instance is shut down, the storage volumes for the virtual desktop instance may still be maintained, but may be detached (unmounted) from the virtual desktop instance and the computing resource instance. In some embodiments, if a user reconnects to a virtual desktop instance was previously shut down, the service provider (or computing resource instance manager) may start the computing resource instance back up and attach the appropriate storage volumes (e.g., on-demand).

In some embodiments, the service provider (or computing resource instance manager) may track when each virtual desktop instance is "in use", meaning that a customer (e.g., an end user in a service provider customer organization) is logged in/connected (e.g., through a client) to the virtual desktop instance. The service provider (or computing resource instance manager) may measure the amount of time (e.g., the number of hour-long time buckets) during which a user is connected, regardless of whether they are actually using the resources to perform a task, and the amount of time (e.g., the number of hour-long time buckets) during which the virtual workspace is active, but the user is not connected to the virtual desktop instance. In some embodiments, the customer organization may be billed differently (e.g., charged different amounts) for the periods during which a user is connected than for the periods during which the virtual workspace is active, but the user is not connected to the virtual desktop instance. In some embodiments, a virtual desktop instance may be considered disconnected (and its underlying computing resource instances eligible to be shut down) only if the connection has been broken from the client side. In other embodiments, a virtual desktop instance may be considered to be effectively disconnected due to inactivity.

Figure 5:
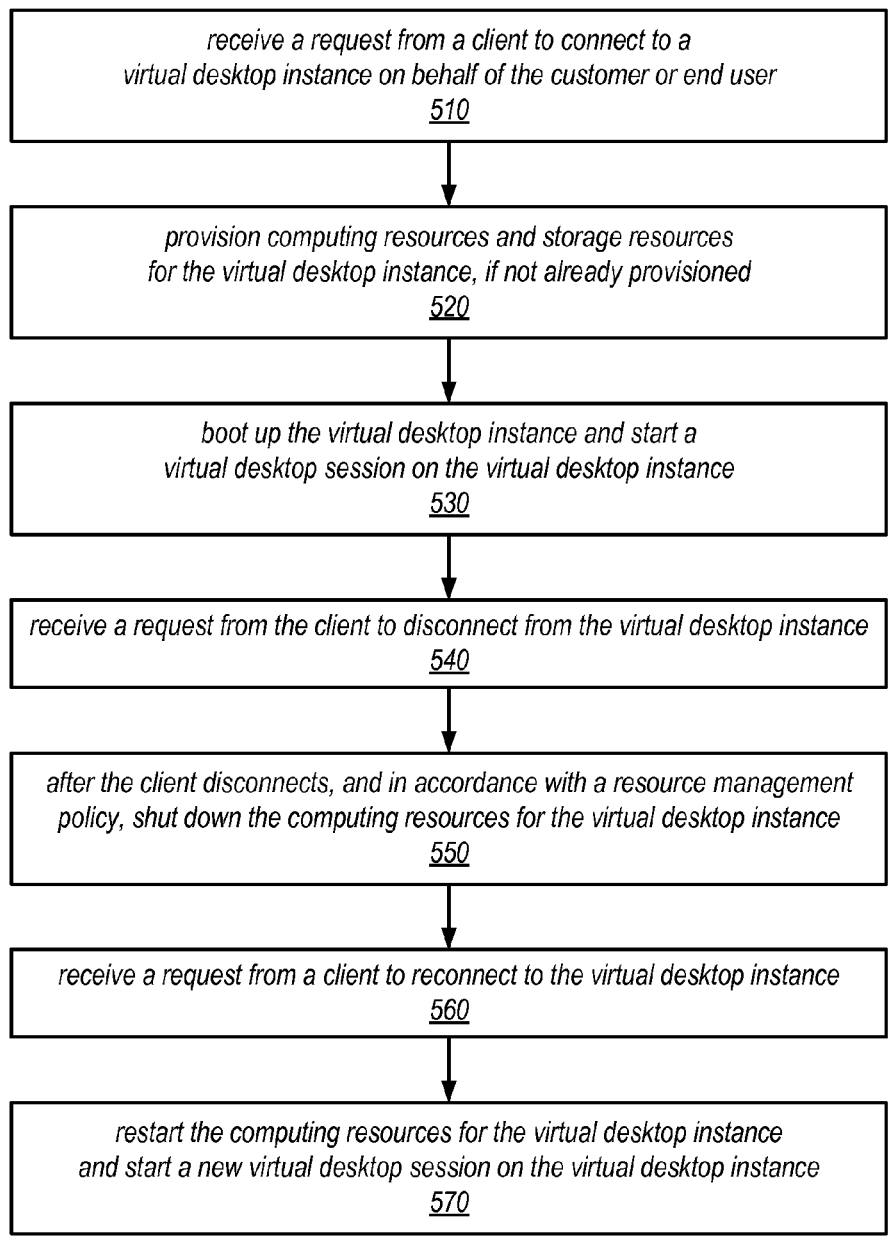
FIG. 5 is a flow diagram illustrating one embodiment of a method for managing resources for virtual desktop instances.

One embodiment of a method for managing resources for virtual desktop instances is illustrated by the flow diagram in FIG. 5. As illustrated at 510, in this example, the method may include receiving (at a service provider) a request from a client to connect to a virtual desktop instance on behalf of a customer or a particular end user (e.g., a request to log into a virtual desktop instance). The method may include the service provider (e.g., resource management logic on the service provider network) provisioning computing resources and storage resources for the virtual desktop instance, if it has not already been provisioned, as in 520. For example, if this is the first time a login request has been received for the virtual desktop instance, the service provider may need to provision and configure virtualized computing resources and/or storage resources to implement the virtual desktop instance. The method may also include starting up the virtual desktop instance (e.g., booting up the underlying computing resources and attaching the storage resources for the virtual desktop instance) and starting a virtual desktop session on the virtual desktop instance, as in 530.

As illustrated in this example, at some point later, the method may include receiving a request from the client to disconnect from the virtual desktop instance, as in 540. The method may include the service provider shutting down the computing resources for the virtual desktop instance after the client disconnects (but not necessarily immediately), in accordance with a resource management policy, as in 550. For example, the resource management policies may include a policy specifying criteria for shutting down the computing resources for a virtual desktop instance (e.g., specifying that they should be shut down two hours after a disconnection or only between the hours of 7 pm and 7 am). At some point later, the method may include receiving a request from a client to reconnect to the virtual desktop instance, as in 560. For example, the request may be received from a client on same machine as the one from which a previous connection request was received or from a client on another machine through which an end user accesses the virtual desktop instance. In response to the request to reconnect, the method may include restarting the computing resources for the virtual desktop instance and starting a new virtual desktop session on the virtual desktop instance, as in 570. Note that, in some embodiments, the operations illustrated in 540-570 may be repeated as additional requests to disconnect from and reconnect to the virtual desktop instance are received on behalf of the customer or a particular end user.

In various embodiments, the service provider (or computing resource instance manager) may employ different mechanisms to determine whether or not there is a connection to a particular virtual desktop instance. For example, in some embodiments, the service provider (or computing resource instance manager) may measure the number of bytes (or the rate) of communication traffic flowing over the network interface to determine whether or not the user is using the virtual desktop instance. In some embodiments, the streaming protocols include two-way communication channels, and the service provider may send information down to the client device representing the output of the pixels. In this example, if a user is watching a video, that pixel data may have a very high change rate. The service provider may also get information back from the client (e.g., mouse clicks and keyboard inputs) which, even if they are encrypted, may provide statistics for determining activity or inactivity on the virtual desktop instance. In this example, the service provider (or computing resource instance manager) may look at heuristics on the total number of packets, the volume at which they are transmitted, etc., and may determine whether an observed pattern or characteristic of the traffic matches a known (or previously observed) pattern or characteristic for activity or inactivity on a virtual desktop instance. If it matches a known (or previously observed) pattern or characteristic for inactivity, the virtual desktop instance may be considered effectively disconnected and its underlying computing resource instances may be eligible to be shut down (in accordance with an applicable shutdown policy). In still other embodiments, when a virtual desktop session is established, a session gateway may be established for that session. For example, a session gateway component may provide a tunnel for one or more virtual desktop sessions, and may detect when those sessions are dropped or otherwise terminated. In some embodiments, the presence or absence of an active session on a particular virtual desktop instance (as detected by the session gateway) may provide a clear picture of whether or not a client is connected to the virtual desktop instance.

More specifically, in some embodiments, a user may be considered to be connected to a virtual desktop instance (e.g., to have an active session on a virtual desktop instance), if they have a logon session on the virtual desktop instance at the time of a detection process. In some embodiments, there may be multiple protocols supported by the service provider system, each of which uses a different mechanism to detect an active session. In one example, if the system supports a PCoIP protocol, each virtual desktop instance may include a software agent that enables the streaming of screen pixels from the virtual desktop instance. In this example, the agent may support two types of login methods: a standard mode and a console mode. The agent may emit session statistics every second, one of which is a property representing the duration of a session in seconds. This property transitions from zero to a non-zero value when a session begins, and transitions from a non-zero value to zero when a PCoIP session is closed. A second software agent on the virtual desktop instance may expose an API through which this information may be obtained to determine whether or not there is an active session on a particular virtual desktop instance. This API may be invoked by a monitoring service at regular intervals, and the data that is retrieved may be provided to the user or customer organization, in some embodiments.

In another example, if the system supports a WebRTC protocol, each virtual desktop instance may house an agent that enables the streaming of screen pixels from the virtual desktop instance. This agent may create a pipe to enable inter-process communication between a WebRTC agent and a second software agent. The WebRTC agent may emit messages relevant to the health of the virtual desktop instance and an active session on the virtual desktop instance for a user. The second agent may attach to the pipe, read these messages, and respond to API invocations made by a monitoring service to determine the health state of the virtual desktop instance and/or the presence (or absence) of an active session for the user.

In yet another example, if the system supports an RDP protocol, users may log into a virtual desktop instance from the customer's virtual private cloud. In this example, there may be two types of login methods supported: a standard mode and a console mode. An agent on each virtual desktop instance may query an operating system level audit account to detect connection (login) and disconnection (logoff) attempts (events). The logon types for these events may be used to distinguish between console mode and standard mode. Note that, in some embodiments in which the service provider system supports multiple protocols (such as the three protocols described herein), this agent may serve as the single point of contact for various monitoring services. In such embodiments, this agent may also perform the functions described as being performed by the "second software agent" in the other two protocols.

Figure 6:
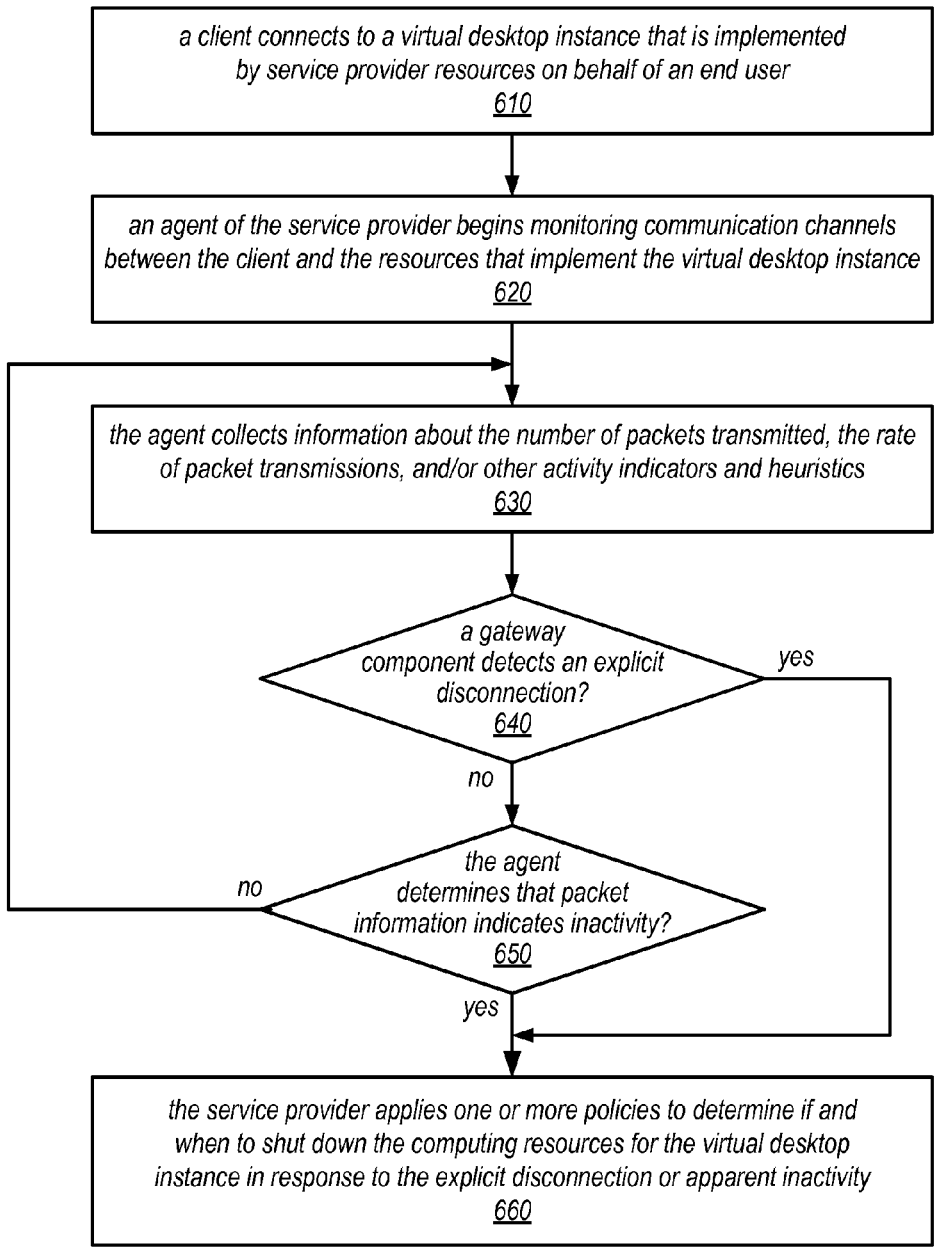
FIG. 6 is a flow diagram illustrating one embodiment of a method for detecting that a client has disconnected from a virtual desktop instance (or has effectively disconnected from a virtual desktop instance through inactivity).

One embodiment of a method for detecting that a client has disconnected from a virtual desktop instance (or has effectively disconnected from a virtual desktop instance through inactivity) is illustrated by the flow diagram in FIG. 6. As illustrated at 610, in this example, the method may include a client connecting to a virtual desktop instance that is implemented by service provider resources on behalf of an end user. In some embodiments, the method may include an agent of the service provider (e.g., logic implemented on service provider resources) beginning to monitor communication channels (e.g., two-way communication channels) between the client and the resources that implement the virtual desktop instance, as in 620. The method may include the agent collecting information about the number of packets transmitted, the rate of packet transmissions, and/or other activity indicators and heuristics, as in 630.

As illustrated in this example, if, at any point, a gateway component on the service provider network detects an explicit disconnection (e.g., by detecting that a virtual desktop session has ended, shown as the positive exit from 640), or if at any point, the agent determines that the collected packet information indicates inactivity (shown as the positive exit from 650), the method may include the service provider applying one or more policies to determine if and when to shut down the computing resources for the virtual desktop instance in response to the explicit disconnection or apparent inactivity (as in 660). In some embodiments, the agent may monitor two-way streaming data and compare the observed traffic patterns to known or previously observed patterns of activity or inactivity to determine whether or not the end user is actively using the virtual desktop instance.

As illustrated in this example, until and unless either of these conditions is detected, the method may include the agent continuing to collect information about the number of packets transmitted, the rate of packet transmissions, and/or other activity indicators and heuristics and/or the gateway component watching for an indication of an explicit disconnection. This is illustrated in FIG. 6 by the path from the negative exit of 640 to 650 and from the negative exit of 650 to 630. Note that, in at least some embodiments, the gateway component and the agent on the service provider may operate in parallel. Note also that, in some embodiments, the service provider may implement a gateway component (such as that described herein) or an agent that monitors communication channels, but may not implement both of these components. In general, the systems described herein may, in various embodiments, implement more, fewer, or different mechanisms for detecting that a client has disconnected from a virtual desktop instance or has effectively disconnected from a virtual desktop instance through inactivity than those described herein.

As described herein, in some embodiments of the systems described herein, the service provider (or computing resource instance manager) may apply some intelligence and/or machine learning in order to decide whether and/or when to shut down the computing resource instances for a virtual desktop instance in response to a disconnection by the client. In some embodiments, such decisions may be dependent on time-based shutdown criteria. For example, the shutdown criteria may specify how long the client has to be disconnected from the virtual desktop instance before the underlying computing resource instance is shut down. In another example, the shutdown criteria may specify that no computing resource instances are shut down between 8 am and 6 pm, even if the user disconnects from the virtual desktop instance, or may specify that there is a longer threshold before the computing resource instance is shut down during those hours.

Some embodiments of the systems described herein may support the use of customer-defined resource management policies, which may include customer-defined shutdown policies. This may allow the customer (or an end user within a customer organization) more control over the state of the resources used to provide services to the customer. For example, in some embodiments, an IT administrator within a service provider customer organization may be able to specify criteria for when and if computing resource instances should be shut down in response to a disconnection from a virtual desktop instance.

In some embodiments, shutdown preferences may be set up by an IT administrator for the virtual desktops that are hosted on behalf of their end users. In one example, the IT administrator may define a policy specifying that the computing resources for a virtual desktop instance should be shut down after two hours following a disconnection by an end user (e.g., because the IT administrator does not want to pay a high rate for the virtual desktop instance during a time period in which it is not being used). Being able to specify how long the computing resource instance should continue to run after a disconnection may allow the IT administrator to grant the end users leeway to disconnect, go to a meeting in a different room and reconnect without the computing resource instance shutting down in between. In another example, an IT administrator at a university who does not trust the students to use virtual desktop instances (and underlying computing resource instances) efficiently may tightly control them by setting a short threshold for shutting down computing resource instances following a disconnection. In other embodiments, an IT administrator may delegate at least some control over resources to their end users. For example, the IT administrator may allow at least some end users to define shutdown policies or shutdown criteria for their own virtual desktop instances. In some embodiments, a resource management policy or shutdown policy may explicitly define a schedule for shutting down computing resource instances for virtual desktop instances. For example, an end user may define a schedule for shutting down and/or restarting a computing resource instances for a virtual desktop instance if the end user knows in advance when they will be connecting to and/or disconnecting from the virtual desktop instance.

Figure 7:
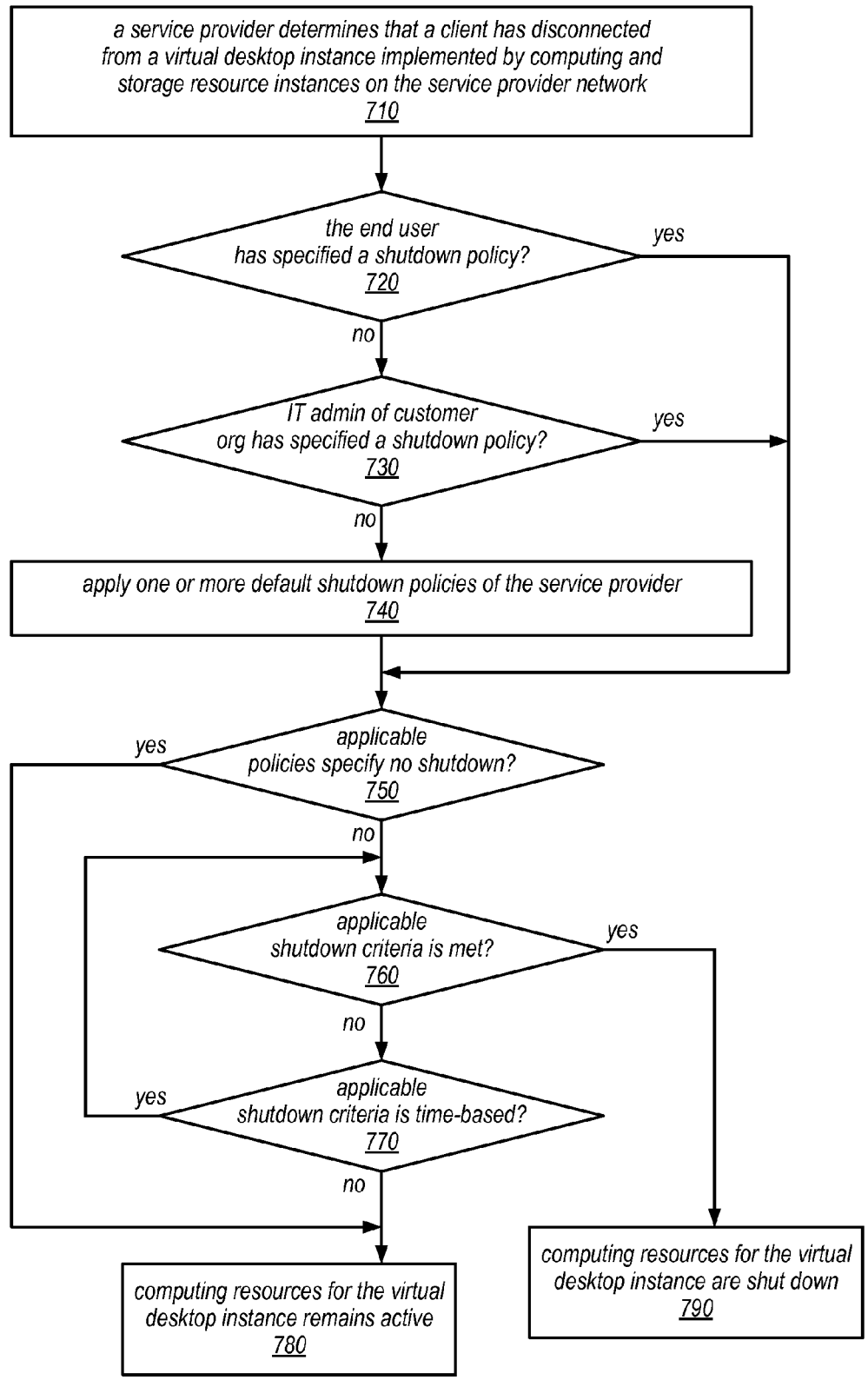
FIG. 7 is a flow diagram illustrating one embodiment of a method for determining whether and/or when to shut down the computing resource instances for a virtual desktop instance by applying one or more shutdown policies.

One embodiment of a method for determining whether and/or when to shut down the computing resource instance(s) for a virtual desktop instance by applying one or more shutdown policies is illustrated by the flow diagram in FIG. 7. In this example, the service provider system may support the specification of shutdown criteria by an IT administrator of the customer organization on whose behalf the virtual desktop instance is instantiated and/or by an end user. For example, the service provider may allow the IT administrator to select or set shutdown policies for their organization and/or to delegate the selection or setting of a shutdown policy to an individual end user (e.g., for a specific virtual desktop instance that is implemented on their behalf). As illustrated at 710, in this example, the method may include a service provider (or resource management logic implemented on the service provider network) determining that a client has disconnected from a virtual desktop instance implemented by computing and storage resource instances on the service provider network.

If the end user has specified a shutdown policy (shown as the positive exit from 720) or if an IT administrator of the customer organization has specified a shutdown policy (shown as the positive exit from 730), the method may include the service provider applying these policies. For example, the end user or IT administrator may have defined one or more conditions under which the underlying computing resource instance(s) for the virtual desktop instance should be shut down following a disconnection. If neither the end user nor the IT administrator of the customer organization has specified a shutdown policy (shown as the negative exits from 720 and 730), the method may include the service provider applying one or more default shutdown policies of the service provider, as in 740.

As illustrated in this example, if the applicable shutdown policies specify that there should not be a shutdown (e.g., that the computing resource instance(s) for a virtual desktop instance should never be shut down during a contracted term of service or that they should not be shut down in response to a disconnection by the client), the method may include the service provider keeping the computing resource instance(s) for the virtual desktop instance active. This is illustrated in FIG. 7 by the path from the positive exit of 750 to 780. If the applicable shutdown criteria is met (shown as the positive exit from 760), the method may include shutting down the computing resource instance(s) for the virtual desktop instance, as in 790.

In some embodiments, if the applicable shutdown criteria is not met, but the applicable shutdown criteria is time-based (e.g., if an applicable policy specifies that the computing resource instance(s) for a virtual desktop instance should be shut down only after a predetermined period of time has passed following a disconnection by the client or only at specified times of day, the method may include waiting for the time-based criteria to be met before shutting down the computing resource instance(s). This is illustrated in FIG. 7 by the negative exit of 760, and the feedback from the positive exit of 770 to 760. In this case, once the time-based criteria is met, the method may include shutting down the computing resource instance(s) for the virtual desktop instance, as in 790.

On the other hand, if the applicable shutdown criteria is not met (shown as the negative exit from 760) and the applicable shutdown criteria is not time-based (shown as the negative exit from 770), the method may include the service provider keeping the computing resource instance(s) for the virtual desktop instance active, as in 780. Note that, in other embodiments, the system may not support all of these types of shutdown policies (e.g., it may not support a hierarchy of shutdown policies) or may support more, fewer, or different mechanisms for determining whether and/or when to shut down the computing resource instance(s) for a virtual desktop instance.

As described herein, in some embodiments, the service provider (or computing resource instance manager) may tracking when a user if connected to a virtual desktop instance and when the user is disconnected from the virtual desktop instance, and may identify patterns of usage for the virtual desktop instance (new patterns, common patterns, or previously observed patterns). The patterns may, in turn, be used as inputs for building predictive models (e.g., on end user basis or customer-wide) for shutting down and restarting computing resource instances with a goal to never have a computing resource instance for a virtual desktop instance be in a shutdown state when a user tries to connect to and/or a goal to maximize the amount of time (e.g., the number or percentage of hours) that a computing resource instance for a virtual desktop instance is running with a connection rather than without a connection. In some embodiments, the information collected by the service provider (or computing resource instance manager) may also be used as inputs to a billing mechanism, as described herein. For example, connections to and/or disconnections from a virtual desktop instance may trigger various types of billing events, in some embodiments.

In one example, the service provider (or computing resource instance manager) may identify, in the collected data, a pattern in which a user typically reconnects frequently throughout the work day. In this example, even if the user disconnects from the virtual desktop instance, the service provider (or computing resource instance manager) may leave the computing resource instance active (e.g., until 6:00). In another example, if the service provider (or computing resource instance manager) identifies, in the collected data, a pattern in which a user only disconnects once a day does not reconnect for the rest of the day, then when the user disconnects from the virtual desktop instance, the service provider (or computing resource instance manager) may immediately shut down the computing resource instance for that virtual desktop instance.

In some embodiments, the service provider (or computing resource instance manager) may, based on the collected data, generate a model for performing a predictive (proactive) shutdown and/or restart, based on observed usage patterns. For example, if the service provider (or computing resource instance manager) determines (e.g. by looking at connection logs) that a given user typically connects to a virtual desktop instance at 9 am, remains connected until they go to lunch at noon (at which point they disconnect), reconnects at 1 pm, and remains connected until they leave the office at 5 pm (at which point they disconnect), the service provider (or computing resource instance manager) may, based on that pattern set, decide to predictively (proactively) boot up this virtual desktop instance every weekday (or work day) at 8 am (e.g., an hour before the user gets in) and to shut it down every weekday (or work day) at 6 pm. In this example, the service provider might not charge them at a connection-based rate until they are actually connected (so the service provider may be taking an expense risk in this case), but it may be worth the expense risk to give the user a great experience, i.e., a fast login time. In this example, the service provider (or computing resource instance manager) may shut down the computing resource instance automatically and may restart (reboot) it automatically, but the user will not know that it was shut down (and that their applications were closed) and then restarted for them. The user will only know that they experience a fast login every day.

In a more complicated example, a user who is connected to a virtual desktop instance at 10:00 in the morning on a particular day may go to a meeting and may not reconnect until 3:00 in the afternoon, and then may disconnect at 6:00 in the evening. In this example, the user's connection/disconnection patterns may vary all over the day, and may be different from day to day. In this example, any predictive model is probably going to have a very low confidence interval. In other words, because this user's connection/disconnection patterns have too much variability, the service provider (or computing resource instance manager) may get into a situation in which it does not have enough confidence to take action. In that case, the service provider (or computing resource instance manager) may apply a default shutdown policy (e.g., waiting for two following a disconnection before shutting down the computing resource instance, or waiting until after 6 pm before shutting down the computing resource instance), or may apply some other low confidence approach that allows the service provider to reclaim capacity without having to take a risk. Note that, in various embodiments, the service provider (or computing resource instance manager) may generate and apply a predictive policy for when to shut down a computing resource instance, may generate and apply a predictive policy for when to restart a computing resource instance, or both.

Figure 8:
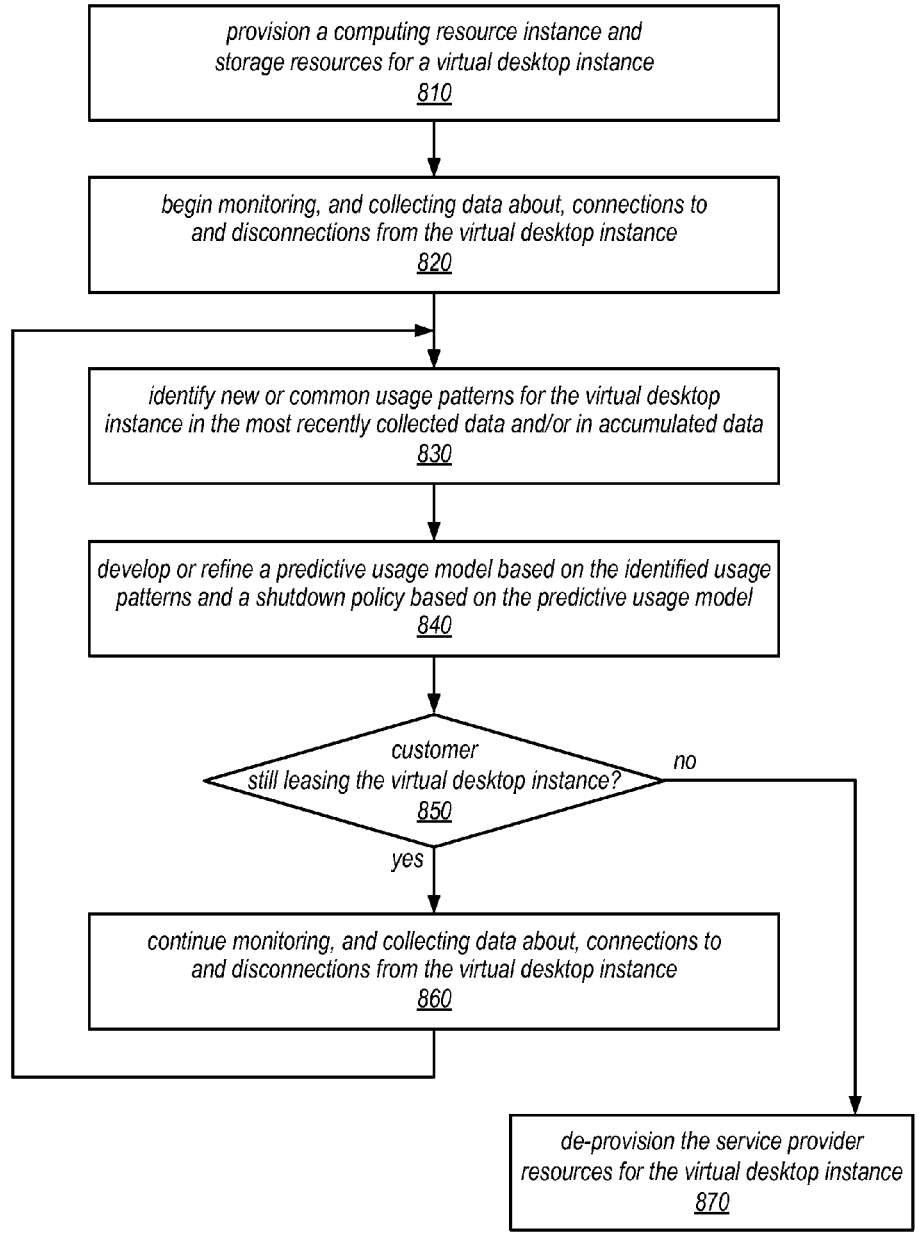
FIG. 8 is a flow diagram illustrating one embodiment of a method for building a predictive model of connections and disconnections for a virtual desktop instance.

One embodiment of a method for building a predictive model of connections and disconnections for a virtual desktop instance is illustrated by the flow diagram in FIG. 8. As illustrated at 810, in this example, the method may include provisioning a computing resource instance and storage resources for a virtual desktop instance on behalf of a service provider customer. The method may include beginning to monitor, and collecting data about, connections to and disconnections from the virtual desktop instance as in 820. For example, such monitoring and collection activities may be performed by logic on the service provider system.

The method may include identifying new and/or common usage patterns for the virtual desktop instance in the most recently collected data and/or in data that has been accumulated over a longer period of time (e.g., over many days, week, and/or virtual desktop sessions), as in 830. The method may also include developing or refining a predictive usage model for the virtual desktop instance based, at least in part, on the identified usage patterns and developing or refining a shutdown policy based on that predictive usage model, as in 840. For example, the predictive usage model may identify times at which a user is predicted to connect to the virtual desktop instance (and at which it may be beneficial for the underlying computing resource instance to already be active) and/or times at which the user is predicted to be disconnected from the virtual desktop instance (and at which it may be safe to shut down the underlying computing resource instance). As illustrated in this example, while the customer is still leasing the virtual desktop instance, the method may include continuing to monitor, and to collect data about, connections to and disconnections from the virtual desktop instance (as in 860), and using that information to refine the predictive usage model and/or shutdown policy (e.g., repeating the operations shown as 830-840). This is illustrated in FIG. 8 by the feedback from 860 to 830.

In some embodiments, once the customer is no longer leasing the virtual desktop instance (e.g., once an agreement for services expires, is cancelled, or is modified so that it does not include the virtual desktop instance), the method may include the service provider de-provisioning the service provider resources for the virtual desktop instance. This is illustrated in FIG. 8 by the feedback from the negative exit of 850 to 870. In some embodiments, information about the identified usage patterns and/or the predictive usage model may be provided to the customer (e.g., to an IT administrator within the customer organization and/or to the end user).

In one embodiment that employs a machine learning approach to determining when and if to shut down and/or restart computing resource instance for virtual desktop instances, the machine learning approach may be based, at least in part, on a fitness function that seeks to avoid having the virtualized computing resource instance in a shutdown state when a client requests a connection to the virtual desktop instance and/or a fitness function that seeks to minimize the amount of time that the virtualized computing resource instance is active but no client is connected to the virtual desktop instance. For example, one fitness function may specify that the computing resource instance for a virtual desktop instance should always be re-launched (or remain active) before the end user needs to connect to the virtual desktop instance. Another fitness function may specify that the computing resource instance for a virtual desktop instance is active for no more than a certain number of hours when no user is connected to it. Between those two fitness functions, the service provider (or computing resource instance manager) would like to be able to predict when the user is going to connect, to launch the computing resource instance prior to that point, and then to shut down the computing resource when appropriate.

As previously noted, in some embodiments, when a computing resource instance for a virtual desktop instance is shut down (e.g., in accordance with a shutdown policy), all of the data for the virtual desktop instance (e.g., for the applications that were running on the virtual desktop instance) may continue to be maintained on one or more storage volumes that are associated with the computing resource instance for the use of the virtual desktop instance, although they may be detached (unmounted) from the computing resource instance. In such embodiments, when the user reconnects, the computing resource instance may be rebooted and the storage volumes may be reattached (mounted) for the use of the virtual desktop instance. In this way, when the user reconnects, their applications may be re-launched as well. In some embodiments, when the user requests a reconnection to the virtual desktop instance, but the computing resource instance that previously implemented (hosted) the virtual desktop instance was shut down, a new computing resource instance (e.g., an instance of the same type as the previous computing resource instance or of another type) may be started for the virtual desktop instance elsewhere and the same storage volume may be attached (mounted) to that new instance.

Figure 9:
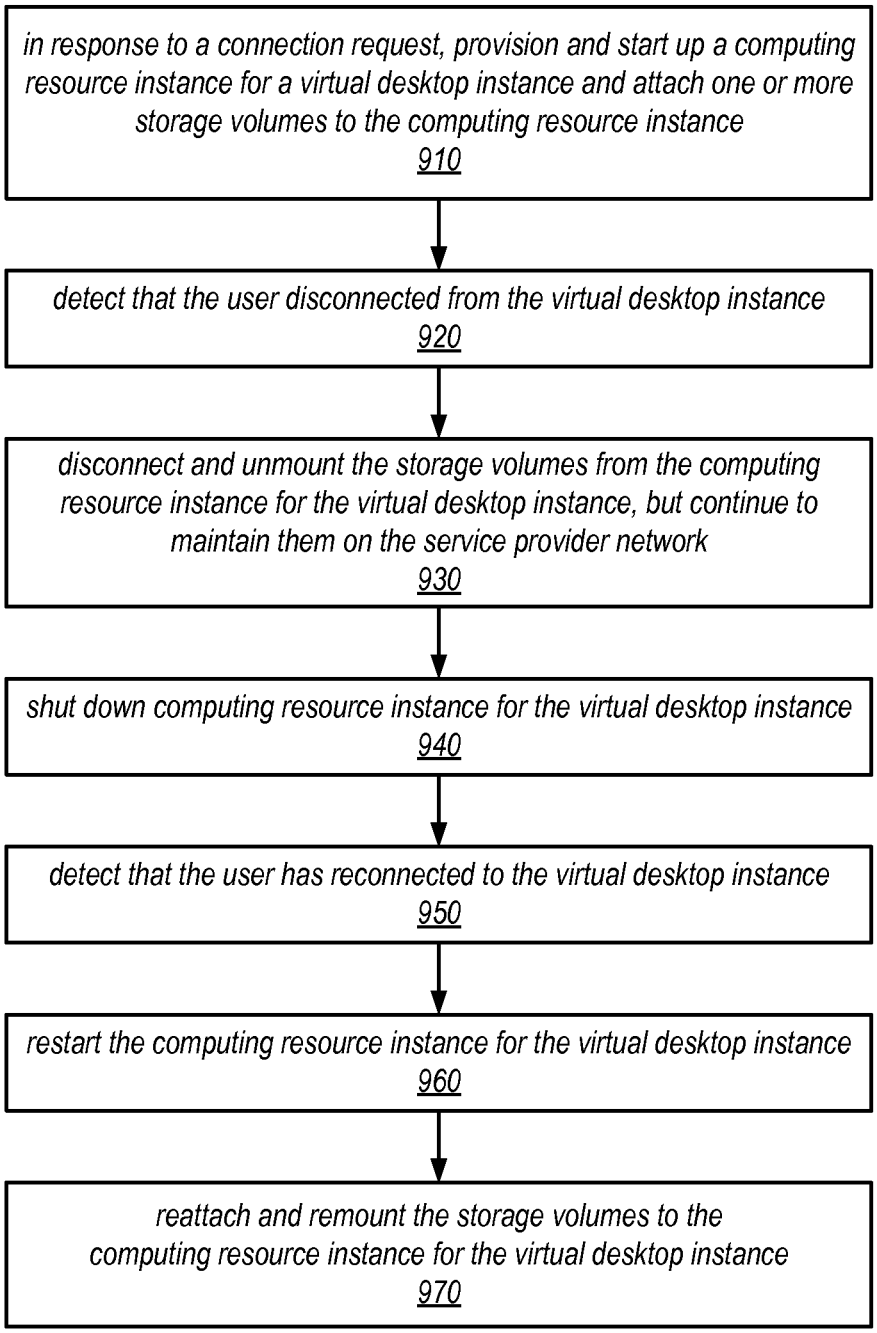
FIG. 9 is a flow diagram illustrating one embodiment of a method for managing service provider resources for a virtual desktop instance in response to a disconnection a reconnection.

One embodiment of a method for managing service provider resources for a virtual desktop instance in response to a disconnection a reconnection is illustrated by the flow diagram in FIG. 9. As illustrated at 910, in this example, the method may include, in response to a connection request, provisioning and starting up a computing resource instance for a virtual desktop instance and attaching one or more storage volumes to the computing resource instance. The method may include, at some point later, detecting that the user has disconnected from the virtual desktop instance, as in 920. In response to the disconnection (and in accordance with a shutdown policy), the method may include disconnecting and unmounting the storage volumes from the computing resource instance for the virtual desktop instance, but continuing to maintain the storage volumes for the virtual desktop instance on the service provider network, as in 930. The method may also include shutting down the computing resource instance for the virtual desktop instance, as in 940.

As illustrated in this example, the method may include, at some point later, detecting that the user has reconnected to the virtual desktop instance, as in 950. In response to the reconnection, the method may include restarting the computing resource instance for the virtual desktop instance (as in 960) and reattaching and remounting the storage volumes to the computing resource instance for the virtual desktop instance (as in 970).

In some embodiments, e.g., when a user requests a reconnection to a virtual desktop instance for which the underlying computing resource instance has been shut down, the user may be able to specify that the virtual desktop instance be hosted on a different computing resource instance type. For example, the user may decide (and may indicate on the client side) that they want to move from a standard-performance instance to a higher performance instance (e.g., by picking an instance type from a drop-down menu of a client-side GUI). In some embodiments, once the newly selected computing resource instance has been started up and configured to host the virtual desktop instance, this may be the default instance type the next tie the user reconnects following a shutdown. In embodiments in which the user is going to be billed at a higher rate during time periods in which they are connected to the virtual desktop instance (e.g., on an hourly basis), if the user knows that they are going to be performing a task that requires better performance, they may upgrade the computing resource instance for their virtual desktop instance to a higher performance (and more expensive) instance type for that time period, and then go back to the previous instance type when they don't need the higher performance. By contrast, if the user is being charged by the month regardless of how long they are connected to the virtual desktop instance or are disconnected from it, they might want to keep a high performance computing resource instance active for their virtual desktop instance all month if they will (or might) need it at some point during the month.

In some embodiments, the user may be able to specify a different storage capacity when they reconnect to their virtual desktop instance. For example, they may decide that they need more storage capacity than was originally provisioned for their virtual desktop instance. In some embodiments, if more storage capacity is requested, the service provider (or computing resource instance manager) may attach (mount) one or more additional storage volumes to the computing resource instance when it is rebooted (or started up) in addition to reattaching the storage volumes that were previously attached (mounted). In other embodiments, the amount of storage capacity that is provisioned for a virtual desktop instance may be fixed and/or may be dependent on the computing resource instance type.

Figure 10:
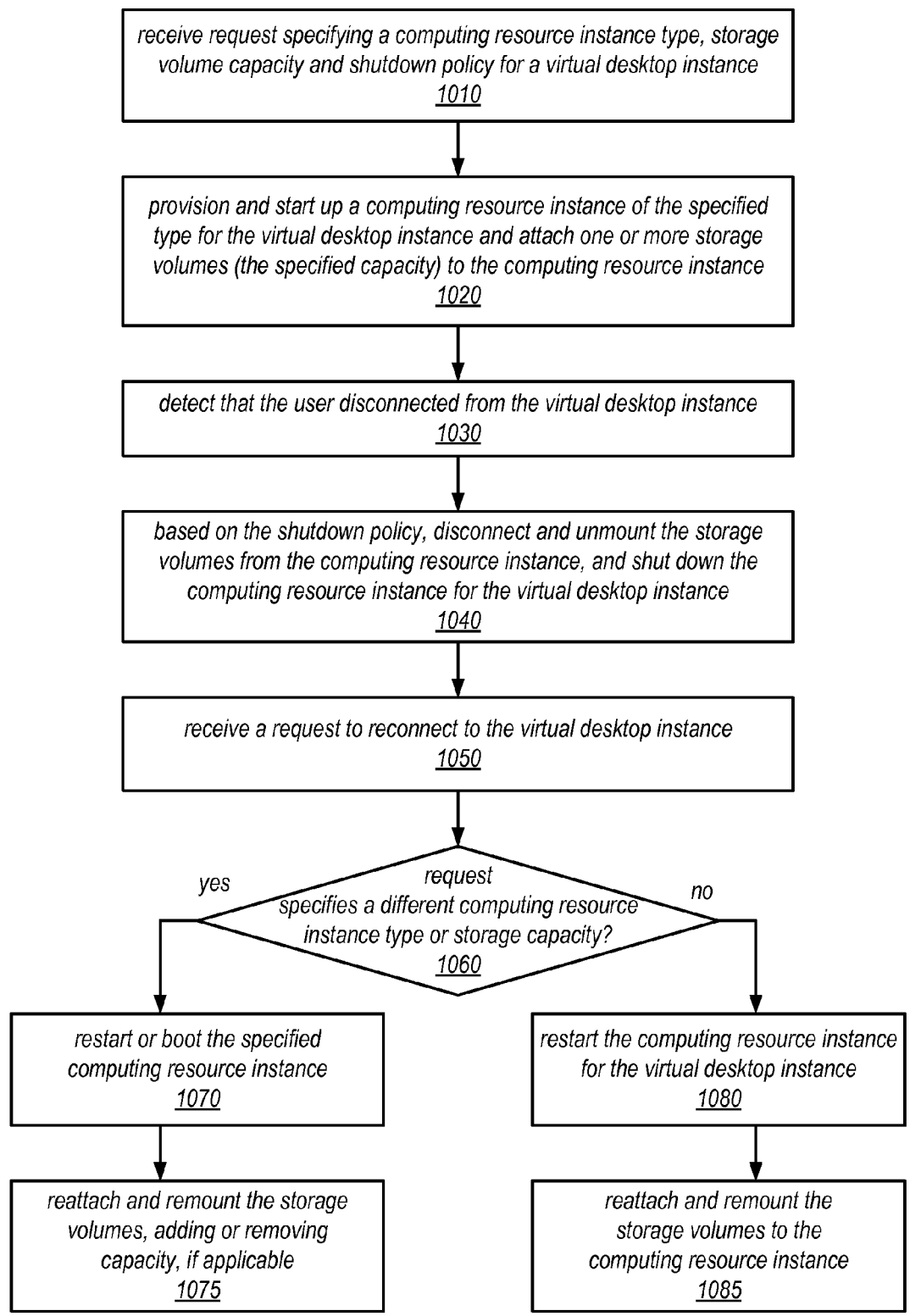
FIG. 10 is a flow diagram illustrating one embodiment of a method for initializing and modifying a configuration and/or shutdown policy for a virtual desktop instance.

One embodiment of a method for initializing and modifying a configuration and/or shutdown policy for a virtual desktop instance is illustrated by the flow diagram in FIG. 10. As illustrated at 1010, in this example, the method may include receiving (e.g., by a service provider) from a user (e.g., through a client), a request specifying a computing resource instance type, a storage volume capacity, and a shutdown policy for a virtual desktop instance. The method may include provisioning and starting up a computing resource instance of the specified type for the virtual desktop instance and attaching one or more storage volumes (e.g., enough to meet the specified capacity) to the computing resource instance, as in 1020. The method may include, at some point later, the service provider system detecting that the user has been disconnected from the virtual desktop instance, as in 1030.

The method may include, in accordance with the shutdown policy, disconnecting and unmounting the storage volumes from the computing resource instance, and shutting down the computing resource instance for the virtual desktop instance, as in 1040. The method may also include, at some point later, the service provider system receiving a request to reconnect to the virtual desktop instance, as in 1050. If the request specifies a different computing resource instance type or storage capacity (shown as the positive exit from 1060), the method may include restarting or booting up a computing resource instance of the specified type (as in 1070) and reattaching and remounting the storage volumes, while adding or removing capacity, if applicable (as in 1075).

However, if the request does not specify a different computing resource instance type or storage capacity (shown as the negative exit from 1060), the method may include restarting the computing resource instance for the virtual desktop instance (as in 1080) and reattaching and remounting the storage volumes to the computing resource instance (as in 1085).

In various embodiments, there may tradeoffs to be made by the service provider between the expense costs associated with keeping computing resource instances active when they are not being used and providing customers with great experiences (e.g., fast connections every time they log in), especially when operating under a connection-based or time bucket based billing model in which they do not charge (or do not charge as much) when the resources are not being used (e.g., when no user is connected to the virtual desktop instance). When operating under this type of billing model, where customers are going to be charged less, the service provider may need to manage their resources such that their costs are also less (in similar proportions). In some embodiments, that may be facilitated by shutting down the computing resource instances for unconnected virtual desktop instances so that those resources can be used for other purposes (e.g., for other virtual desktop instance).

In various embodiments, there may also be tradeoffs to be made by the customer or end user between the costs to the user for their virtual desktop instances vs. the performance they experience when they reconnect to their virtual desktop instance (e.g., it may take multiple orders of magnitude longer to reconnect/log in if the computing resource instance has been shut down).

In some embodiments, if the service provider (or computing resource instance manager) decides when to leave a computing resource instance running (e.g., using a default or predictive model) then the service provider may absorb that cost. However, if an IT administrator or end user within a customer organization makes those choices (by defining a resource management policy that include shutdown criteria), then the customer may be charged (e.g., at the connected rate) for all of the time that the computing resource instance remains active, even after a disconnection. For example, if the customer defines shutdown criteria specifying that the computing resource instance should not be shut down until two hours after a disconnection, the customer may have to pay at the connected rate for the extra two hours after the disconnection. In some embodiments, the system may implement a hybrid approach, in which there may be some default policies defined by the service provider and/or by the IT administrator of the customer organization, but these default policies may be overridden in certain scenarios (e.g., by a user that stays connected longer or who is granted permission from the IT administrator to apply a different policy.

In some existing systems that provide virtual desktop instances to customer organizations and their end users, the customer are billed on a monthly basis for their virtual desktop instances as long as they are active (and regardless of whether, how often, and/or for how long any end user is connected to the virtual desktop instance). For example, if a customer created a virtual desktop instance on the $20^{th}$ of the month, for the rest of that month (e.g., from the $20^{th}$ to the $30^{th}$ of the month) they will be charged on a pro-rated basis. However, if they have a virtual desktop instance on the $1^{st}$ of the month, they may be charged for that virtual desktop instance for the entire month even if they delete it on the $2^{nd}$ of the month. As previously noted, in some embodiments, the systems described herein may, instead, employ a time bucket based approach to resource management and/or billing for virtual desktop instances, which may be applied in combination with a connection-based approach to resource management and billing. For example, in an embodiment in which customers are charged by the hour for virtual desktop instances that are hosted on behalf of their end users, In one example, under such a combination billing model, customers may be charged for a virtual desktop instance based on two different dimensions:

1) the number of hours that they are actually using the virtual desktop instance (or, more specifically, the number of one-hour-long time periods during which an end user is connected to the virtual desktop instance for any portion of the one-hour-long time period). The service provider (or computing resource instance manager) may keep track of how long the end users are using the virtual desktop instance and may provide that information to a billing mechanism as the amount of time (or the number of time buckets) for which the customer should be charged at connected rate.

2) the number of hours during which the customer has a virtual desktop instance running but that is not being used (or, more specifically, the number of one-hour-long time periods during which no end user is connected to the virtual desktop instance for any portion of the one-hour-long time period). The service provider (or computing resource instance manager) may keep track of how long the end users are not using the virtual desktop instance and may provide that information to a billing mechanism as the amount of time (or the number of time buckets) for which the customer should be charged at non-connected rate.

Note that the non-connected rate may be much lower than the connected rate, and may essentially be a charge for maintaining the virtual desktop instance and associated storage volumes on the customer's behalf. For example, in one embodiment, the connected rate may be multiple cents (or tens of cents) per hour, but the non-connected rate may be a fraction of a cent per hour. In some embodiments, and for some customers and workloads, the combined cost to the customer for the time billed at the connected rate and the time billed at the non-connected rate may be much less than what they would have paid under a monthly billing approach. In some embodiments, a customer may be able to specify that they do not need the service provider to maintain the storage volumes associated with a virtual desktop instance after being disconnected from it (e.g., if they are not planning to reconnect to the virtual desktop instance after a particular virtual desktop session, if they are only planning to use the virtual desktop instance and its resources during a single virtual desktop session, or if their use of the virtual desktop instance does not depend on maintaining any history or state for the virtual desktop instance between virtual desktop sessions). In such embodiments, the service provider may disconnect the storage volumes that are associated with the virtual desktop instance upon detecting inactivity or an explicit disconnection and may re-allocate them for other uses (e.g., after deleting any information that is specific to the virtual desktop instance). In such embodiments, the service provider may charge the customer a different rate for the virtual desktop instance when no users are connected to the virtual desktop instance than the standard non-connected rate (e.g., an even lower rate), since the service provider does not have to maintain the storage volumes for that particular virtual desktop instance.

In some embodiments, a service provider system may employ a time bucket based approach to resource management and/or billing for virtual desktop instances, which may be applied in combination with a connection-based approach to resource management and billing for time buckets other than hourly time buckets. For example, a this approach may be applied to time buckets of one minute, a day, one week, one month, or any other predefined time period, in different embodiments.

As previously noted, in some embodiments, the systems described herein may be able to detect inactivity for a virtual desktop instance and may apply a shutdown policy as if the virtual desktop instance were effectively disconnected. For example, if a user walks away from their laptop and it stays connected to their virtual computing instance all weekend (e.g., when they are not using it), the most customer-centric thing for the service provider to do may be to disconnect the virtual desktop instance and/or shut down the underlying computing resource instance (according to predefined shutdown criteria), rather than charging the customer at the connected rate.

In some embodiments, the service provider (or computing resource instance manager) may be able to determine when an end user is streaming something to a virtual desktop instance from an entity other than the actual virtual desktop instance client. For example, an IT administrator may, in response to an end user reporting a problem with their virtual desktop instance, connect to the virtual desktop instance (for trouble-shooting) from a streaming solution, such as the Remote Desktop Protocol (RDP) developed by Microsoft Corporation. In some embodiments, component of the virtual desktop instance may be able to identify when such a session is active, and the service provider may be able to bill during that time, even though monitoring mechanisms described earlier may not detect that activity. In some embodiments, if the IT administrator needs to trouble-shoot a virtual desktop instance, they may be able to request that (at least temporarily) the computing resource instance remain active, regardless of whether any shutdown policies would otherwise be applicable.

Note that, in some embodiments, the concepts described herein for implementing connection-based resource management for virtual desktop instances may be applied in systems in which the computing resource instances are pooled. For example, they may be applied within each of multiple pools of resources (e.g., customer-specific pools of resources) or within one large pool of resources that is managed on the service provider side, in different embodiments.

Illustrative System

In at least some embodiments, a server that implements some or all of the techniques for managing resources for virtual desktop instances as described herein may include a computer system that includes or is configured to access a non-transitory computer-accessible (e.g., computer-readable) media, such as computer system 1100 illustrated in FIG. 11. For example, in various embodiments, any or all of the computer system components described herein (including, e.g., data center computers and/or other components on a service provider network that collectively provide virtual computing services and/or virtual storage services, virtualized computing resource instances, virtual machines, virtual machine monitors or hypervisors, session gateway components, computing resource instance managers, and/or virtual desktop instances; or client computing devices or other components on a client network) may be implemented using a computer system similar to computer system 1100 that has been configured to provide the functionality of those components. In the illustrated embodiment, computer system 1100 includes one or more processors 1110 coupled to a system memory 1120 via an input/output (I/O) interface 1130. Computer system 1100 further includes one or more network interfaces 1140 coupled to I/O interface 1130. In some embodiments, network interfaces 1140 may include two or more network interfaces (including, e.g., one configured for communication between a virtualized computing resource hosted on the computer system 1100 and its clients, and one configured for communication between a virtualized computing resource and external resources, computing systems, data centers, or Internet destinations on networks other than the provider network and a client network on whose behalf the virtualized computing resources are hosted.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for managing resources for virtual desktop instances, are shown stored within system memory 1120 as code 1125 and data 1126.

In one embodiment, I/O interface 1130 may be configured to coordinate I/O traffic between processor 1110, system memory 1120, and any peripheral devices in the device, including any of network interface(s) 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface(s) 1140 may be configured to allow data to be exchanged between computer system 1100 and other devices 1160 attached to a network or networks 1150, such as other computer systems or devices as illustrated in the figures, for example. In various embodiments, network interface(s) 1140 may support communication via any suitable wired or wireless general data networks, such as types of Ethernet network, for example. Additionally, network interface(s) 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above for implementing various embodiments of the techniques for managing resources for virtual desktop instances described herein. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 1100 via I/O interface 1130. A non-transitory computer-accessible (e.g., computer-readable) storage medium may also include any volatile or non-volatile media such as RAM (e.g. SDRAM, DDR SDRAM, RDRAM, SRAM, etc.), ROM, etc, that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface(s) 1140.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A method, comprising:
performing, by one or more computers on a service provider network:
provisioning, by a computing resource instance manager implemented on one of the one or more computers on behalf of a service provider customer, resources that implement a virtual desktop instance for a user, wherein the resources that implement the virtual desktop instance comprise a computing resource instance and a storage volume accessible to the computing resource instance over a network;
detecting that the user has connected to the virtual desktop instance through a client over a network connection and that the virtual desktop instance has been started, wherein starting the virtual desktop instance comprises attaching for network access the storage volume to the computing resource instance;
detecting that the user has disconnected from the virtual desktop instance based at least in part on monitoring of the network connection for an inactivity period that exceeds an inactivity threshold;
determining, in response to the detection that the user has disconnected from the virtual desktop instance and based at least in part on a resource management policy, that the virtual desktop instance should be shut down;

shutting down, in response to the determination, the virtual desktop instance while maintaining data for the virtual desktop instance on the storage volume, wherein shutting down the virtual desktop instance comprises shutting down the computing resource instance, detaching the storage volume from the virtual desktop instance, and making the computing resource instance available for another user;

detecting that a user has reconnected to the virtual desktop instance through a client; and in response to detecting that a user has reconnected to the virtual desktop instance, restarting the virtual desktop instance, wherein restarting the virtual desktop instance comprises attaching for network access the storage volume to a different computing resource instance and booting up the different computing resource instance for the virtual desktop instance.

2. The method of claim 1,
wherein the resource management policy specifies criteria associated with shutting down service provider resources.

3. The method of claim 2,
wherein at least some of the criteria represents a customer-specific shutdown policy defined by the service provider customer, a user-specific shutdown policy defined by an end user, or an instance-specific shutdown policy.

4. The method of claim 2,
wherein the criteria comprises one or more of:
an amount of time that must pass following a disconnection before shutting down the service provider resources;
a window of time during which service provider resources can be shut down;
a window of time during which service provider resources cannot be shut down; or
a schedule for shutting down service provider resources.

5. A system, comprising:
a plurality of computing nodes that collectively provide virtual computing services to one or more clients, each of the computing nodes comprising at least one processor and a memory;
one or more virtualized computing resource instances executing on a respective one of the computing nodes, wherein one of the virtualized computing resource instances is configured to implement a virtual desktop instance for a client;
a storage volume implemented on another one of the computing nodes, wherein the storage volume is attached for network access to the one of the virtualized computing resource instances; and
a computing resource instance manager executing on at least one of the computing nodes;
wherein the computing resource instance manager is configured to:
detect that the client has connected to the virtual desktop instance over a network connection and that the storage volume is attached for network access to the one of the virtualized computing resource instances;
detect that the client has been disconnected from the virtual desktop instance based at least in part on monitoring of a network connection for an inactivity period that exceeds an inactivity threshold;
determine, based at least in part on a resource management policy, whether or not the one of the virtualized computing resource instances should be shut down in response to the detection that the client has been disconnected from the virtual desktop instance;
shut down, in response to the determination, the one of the virtualized computing resource instances while maintaining data for the virtual desktop instance on the storage volume, wherein to shut down the one of the virtualized computing resource instances the computing resource instance manager is configured to:
detach the storage volume from the one of the virtualized computing resource instances; and
make the one of the virtualized computing resource instances available for another client; and
restart, in response to detection that a client has reconnected to the virtual desktop instance, the virtual desktop instance, wherein to restart the virtual desktop instance the computing resource instance manager is configured to:
attach for network access the storage volume to a different computing resource instance; and
boot the different computing resource instance for the virtual desktop instance.

6. The system of claim 5,
wherein to detect that the client has been disconnected from the virtual desktop instance, the computing resource instance manager is configured to:
monitor data that is transmitted between the client and the one of the virtualized computing resource instances; and
compare the data to one or more patterns or characteristics.

7. The system of claim 5,
wherein to detect that the client has been disconnected from the virtual desktop instance, the computing resource instance manager is configured to determine that a session gateway has detected that the client has been disconnected from the virtual desktop instance.

8. The system of claim 5,
wherein determining whether or not the one of the virtualized computing resource instances should be shut down is based, at least in part, on an amount of time that has passed since the client was disconnected from the virtual desktop instance.

9. The system of claim 5,
wherein the computing resource instance manager is configured to generate a model for shutting down the one of the virtualized computing resource instances based, at least in part, on historical data for disconnections for the virtual desktop instance; and
wherein determining whether or not the one of the virtualized computing resource instances should be shut down is based, at least in part, on the model.

10. The system of claim 5,
wherein the computing resource instance manager is configured to:
detect that the client has been reconnected to the virtual desktop instance; and
restart the one of the virtualized computing resource instances in response to detecting that the client has been reconnected to the virtual desktop instance.

11. The system of claim 5,
wherein the computing resource instance manager is configured to:
detect that the client has been reconnected to the virtual desktop instance; and provision another one of the virtualized computing resource instances to implement the virtual desktop instance in response to detecting that the client has been reconnected to the virtual desktop instance, wherein the other one of the virtualized computing resource instances is an instance of a same type as the one of the virtualized computing resource instances.

12. The system of claim 5,
wherein the computing resource instance manager is configured to:
detect that the client has been reconnected to the virtual desktop instance; and
provision another one of the virtualized computing resource instances to implement the virtual desktop instance in response to detecting that the client has been reconnected to the virtual desktop instance, wherein the other one of the virtualized computing resource instances is an instance of a different type than the one of the virtualized computing resource instances.

13. The system of claim 5,
wherein the computing resource instance manager is configured to:
generate a model for restarting the one of the virtualized computing resource instances based, at least in part, on historical data for reconnections for the virtual desktop instance; and
restart the one of the virtualized computing resource instances based, at least in part, on the model.

14. A non-transitory computer-readable storage medium storing program instructions that when executed on one or more computers cause the one or more computers to perform:
monitoring operation of a virtualized computing resource instance that implements a virtual desktop instance for one or more clients, wherein said monitoring comprises tracking connections to the virtual desktop instance and disconnections from the virtual desktop instance by the one or more clients during one or more time periods of a pre-determined duration, wherein the disconnections are based at least in part on an inactivity period that exceeds an inactivity threshold;
generating, based at least in part on said monitoring, a model for determining when to proactively shut down the virtualized computing resource instance or when to shut down the virtualized computing resource instance following a disconnection from the virtual desktop instance;
shutting down the virtualized computing resource instance based at least in part on applying the model, wherein shutting down the virtualized computing resource comprises detaching a storage volume currently attached for network access to the virtualized computing resource and where data for the virtual desktop instance is maintained;
tracking that the virtualized computing resource instance has been shut down;
making the virtualized computing resource instance that has been shut down available for another client;
detecting that a client has reconnected to the virtual desktop instance; and
restarting the virtual desktop instance responsive to the detection, wherein restarting the virtual desktop instance comprises attaching for network access the storage volume to a different virtualized computing resource instance and booting up the different virtualized computing resource instance for the virtual desktop instance.

15. The non-transitory computer-readable storage medium of claim 14, wherein when executed on the one or more computers, the program instructions further cause the one or more computers to perform:
generating, based at least in part on said monitoring, a model usable to determine when to restart the virtualized computing resource instance following a shutdown of the virtualized computing resource instance.

16. The non-transitory computer-readable storage medium of claim 14,
wherein generating the model comprises applying a machine learning technique that is based, at least in part, on a fitness function for avoiding having the virtualized computing resource instance in a shutdown state when a client requests a connection to the virtual desktop instance or for minimizing the amount of time that the virtualized computing resource instance is active but no client is connected to the virtual desktop instance.

17. The non-transitory computer-readable storage medium of claim 14, wherein when executed on the one or more computers, the program instructions further cause the one or more computers to perform:
making the virtualized computing resource instance available for implementing another virtual desktop instance.

18. The non-transitory computer-readable storage medium of claim 14, wherein when executed on the one or more computers, the program instructions further cause the one or more computers to perform:
providing, based at least in part on said monitoring, information about connections to and disconnections from the virtual desktop instance to a billing mechanism of a service provider, wherein the billing mechanism distinguishes between time periods during which a client is connected to the virtual desktop instance and time periods during which no client is connected to the virtual desktop instance.

* * * * *